US011556678B2

(12) United States Patent
Mehr

(10) Patent No.: US 11,556,678 B2
(45) Date of Patent: Jan. 17, 2023

(54) DESIGNING A 3D MODELED OBJECT VIA USER-INTERACTION

(71) Applicant: Dassault Systemes, Velizy Villacoublay (FR)

(72) Inventor: Eloi Mehr, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 123 days.

(21) Appl. No.: 16/723,884

(22) Filed: Dec. 20, 2019

(65) Prior Publication Data
US 2020/0202045 A1 Jun. 25, 2020

(30) Foreign Application Priority Data

Dec. 20, 2018 (EP) .................................. 18306758

(51) Int. Cl.
*G06F 30/12* (2020.01)
*G06F 30/27* (2020.01)
(Continued)

(52) U.S. Cl.
CPC .............. *G06F 30/12* (2020.01); *G06F 30/27* (2020.01); *G06T 9/001* (2013.01); *G06T 9/002* (2013.01);
(Continued)

(58) Field of Classification Search
CPC ...... G06F 30/12; G06F 30/27; G06F 2111/10; G06F 2111/04; G06F 30/13; G06F 30/10;
(Continued)

(56) References Cited

U.S. PATENT DOCUMENTS 4,821,214 A * 4/1989 Sederberg ............... G06T 19/20
345/420
5,796,400 A * 8/1998 Atkinson ............... G06T 17/30
345/647
(Continued)

FOREIGN PATENT DOCUMENTS

EP 3 396 603 A1 10/2018

OTHER PUBLICATIONS

Tung-Ying Lee and Shang-Hong Lai, "3D non-rigid registration for MPU implicit surfaces," 2008 IEEE Computer Society Conference on Computer Vision and Pattern Recognition Workshops, 2008, pp. 1-8, doi: 10.1109/CVPRW.2008.4563084. (Year: 2008).*
(Continued)

*Primary Examiner* — Charles L Beard
(74) *Attorney, Agent, or Firm* — Oblon, McClelland, Maier & Neustadt, L.L.P.

(57) ABSTRACT

A computer-implemented method for designing a 3D modeled object via user-interaction. The method includes obtaining the 3D modeled object and a machine-learnt decoder. The machine-learnt decoder is a differentiable function taking values in a latent space and outputting values in a 3D modeled object space. The method further includes defining a deformation constraint for a part of the 3D modeled object. The method further comprises determining an optimal vector. The optimal vector minimizes an energy. The energy explores latent vectors. The energy comprises a term which penalizes, for each explored latent vector, non-respect of the deformation constraint by the result of applying the decoder to the explored latent vector. The method further includes applying the decoder to the optimal latent vector. This constitutes an improved method for designing a 3D modeled object via user-interaction.

14 Claims, 8 Drawing Sheets

(51) Int. Cl.
  *G06T 9/00* (2006.01)
  *G06F 111/10* (2020.01)
  *G06N 3/04* (2006.01)
  *G06N 3/08* (2006.01)
(52) U.S. Cl.
  CPC ........ *G06F 2111/10* (2020.01); *G06N 3/0454* (2013.01); *G06N 3/088* (2013.01); *G06T 2200/04* (2013.01); *G06T 2200/24* (2013.01)
(58) Field of Classification Search
  CPC ...... G06F 30/00; G06F 2111/16; G06T 9/001; G06T 9/002; G06T 2200/04; G06T 2200/24; G06T 19/20; G06T 17/205; G06T 7/60; G06T 2207/20084; G06T 17/00; G06T 2219/2021; G06N 3/0454; G06N 3/088; G06N 3/02; G06N 3/08; H04N 13/275
  See application file for complete search history.

(56) References Cited

U.S. PATENT DOCUMENTS

| | | | | |
|---|---|---|---|---|
| 6,573,890 | B1* | 6/2003 | Lengyel | G06T 9/001 345/418 |
| 8,666,119 | B1* | 3/2014 | Mallet | G06T 7/251 382/103 |
| 9,779,546 | B2* | 10/2017 | Hunt | G01B 11/00 |
| 10,262,448 | B2* | 4/2019 | Bailey | G06T 13/40 |
| 10,395,372 | B2* | 8/2019 | Anand | G06F 30/20 |
| 10,504,005 | B1* | 12/2019 | Walters | G06K 9/6298 |
| 10,575,955 | B2* | 3/2020 | Mahfouz | A61F 2/4657 |
| 10,600,184 | B2* | 3/2020 | Golden | G06N 3/08 |
| 10,628,537 | B2* | 4/2020 | Van der Velden | G06F 30/20 |
| 10,650,572 | B2* | 5/2020 | Rorato | G06T 3/0037 |
| 10,664,979 | B2* | 5/2020 | Krebs | A61B 5/4848 |
| 10,691,133 | B1* | 6/2020 | Abeloe | G06N 3/0445 |
| 10,692,277 | B1* | 6/2020 | Sunkavalli | G06K 9/6256 |
| 10,719,742 | B2* | 7/2020 | Shechtman | G06N 3/088 |
| 10,769,848 | B1* | 9/2020 | Wang | G06T 15/005 |
| 10,803,646 | B1* | 10/2020 | Bogan, III | G06T 5/005 |
| 10,818,043 | B1* | 10/2020 | Barnes | G06T 7/40 |
| 10,832,095 | B2* | 11/2020 | Panciatici | G06K 9/6255 |
| 10,839,267 | B2* | 11/2020 | Mehr | G06K 9/6203 |
| 10,871,536 | B2* | 12/2020 | Golden | G06N 3/02 |
| 10,885,707 | B1* | 1/2021 | Fu | G06N 3/08 |
| 10,902,343 | B2* | 1/2021 | Andrews | G06K 9/6273 |
| 10,909,746 | B1* | 2/2021 | Kantar | G06T 17/20 |
| 10,915,680 | B2* | 2/2021 | Pedersen | G06F 30/17 |
| 10,929,433 | B2* | 2/2021 | Rorato | G06V 20/653 |
| 10,930,066 | B1* | 2/2021 | Thacker | G06F 40/40 |
| 10,937,237 | B1* | 3/2021 | Kim | G06T 7/593 |
| 10,943,037 | B2* | 3/2021 | Chauhan | G06F 30/23 |
| 10,963,811 | B2* | 3/2021 | Grehant | G06F 16/901 |
| 10,974,446 | B2* | 4/2021 | Nosenzo | G06T 17/10 |
| 10,984,317 | B2* | 4/2021 | Panciatici | G06N 3/08 |
| 10,984,606 | B1* | 4/2021 | Dalmia | G06T 19/20 |
| 10,996,651 | B2* | 5/2021 | Deslandes | B33Y 50/02 |
| 11,027,493 | B2* | 6/2021 | Schmidt | G06T 17/20 |
| 11,030,772 | B2* | 6/2021 | Dixit | G06T 7/194 |
| 11,164,069 | B1* | 11/2021 | Korsunsky | G06N 3/0445 |
| 11,170,301 | B2* | 11/2021 | Zhang | G06N 3/0481 |
| 11,308,657 | B1* | 4/2022 | Berlin | G06V 40/174 |
| 2004/0068187 | A1* | 4/2004 | Krause | A61B 17/15 600/443 |
| 2004/0095374 | A1* | 5/2004 | Jojic | G06T 7/215 715/716 |
| 2004/0148145 | A1* | 7/2004 | Chen | G06F 30/23 703/2 |
| 2006/0122999 | A1* | 6/2006 | Sosnov | G06F 16/5854 707/999.005 |
| 2008/0162090 | A1* | 7/2008 | Perry | G06F 30/23 703/1 |
| 2008/0180448 | A1* | 7/2008 | Anguelov | G06T 13/40 345/475 |
| 2008/0275677 | A1* | 11/2008 | Landon | G06F 30/23 703/2 |
| 2008/0300502 | A1* | 12/2008 | Yang | A61B 5/0064 600/534 |
| 2009/0279784 | A1* | 11/2009 | Areas | G06T 15/00 382/190 |
| 2010/0111370 | A1* | 5/2010 | Black | G06K 9/00369 382/111 |
| 2013/0076619 | A1* | 3/2013 | Carr | G06F 3/002 345/156 |
| 2013/0120357 | A1* | 5/2013 | Joshi | G06T 19/20 345/419 |
| 2014/0362091 | A1* | 12/2014 | Bouaziz | G06T 15/503 345/473 |
| 2015/0178938 | A1* | 6/2015 | Gorman, III | G06T 7/174 382/131 |
| 2015/0206341 | A1* | 7/2015 | Loper | G06V 40/103 345/420 |
| 2015/0213646 | A1* | 7/2015 | Ma | G06T 7/50 345/420 |
| 2015/0221116 | A1* | 8/2015 | Wu | A61B 1/00009 382/128 |
| 2016/0240001 | A1* | 8/2016 | Sheffer | G06T 17/20 |
| 2016/0284089 | A1* | 9/2016 | Gulaka | G06T 7/33 |
| 2016/0328998 | A1* | 11/2016 | Pedersen | A61B 8/4254 |
| 2016/0379112 | A1* | 12/2016 | He | G06N 3/0454 706/25 |
| 2017/0032579 | A1* | 2/2017 | Eisemann | G06T 17/205 |
| 2017/0109881 | A1* | 4/2017 | Avendi | G06T 7/149 |
| 2017/0143494 | A1* | 5/2017 | Mahfouz | A61F 2/34 |
| 2017/0220850 | A1* | 8/2017 | Caprioli | G06T 7/0012 |
| 2017/0340447 | A1* | 11/2017 | Mahfouz | A61F 2/30942 |
| 2017/0372480 | A1* | 12/2017 | Anand | G06T 19/20 |
| 2018/0055644 | A1* | 3/2018 | Mahfouz | A61B 90/06 |
| 2018/0089888 | A1* | 3/2018 | Ondruska | G06T 15/20 |
| 2018/0095450 | A1* | 4/2018 | Lappas | B33Y 10/00 |
| 2018/0182152 | A1* | 6/2018 | Pan | G06T 17/205 |
| 2018/0261008 | A1* | 9/2018 | Elber | G06T 17/10 |
| 2018/0276821 | A1* | 9/2018 | Lin | G16H 50/30 |
| 2018/0293711 | A1* | 10/2018 | Vogels | G06K 9/6256 |
| 2018/0314917 | A1* | 11/2018 | Mehr | G06V 30/19173 |
| 2018/0315230 | A1* | 11/2018 | Black | G06T 17/00 |
| 2018/0365532 | A1* | 12/2018 | Molchanov | G06N 3/084 |
| 2019/0057167 | A1* | 2/2019 | Reichert | G06F 30/15 |
| 2019/0073580 | A1* | 3/2019 | Dzhulgakov | G06N 3/084 |
| 2019/0073581 | A1* | 3/2019 | Chen | G06N 3/04 |
| 2019/0073586 | A1* | 3/2019 | Chen | G06N 7/005 |
| 2019/0073590 | A1* | 3/2019 | Wu | G06F 9/00 |
| 2019/0130639 | A1* | 5/2019 | Boyce | G06F 3/013 |
| 2019/0147234 | A1* | 5/2019 | Kicanaoglu | G06K 9/00214 382/218 |
| 2019/0180409 | A1* | 6/2019 | Moloney | G05D 1/0274 |
| 2019/0188562 | A1* | 6/2019 | Edwards | G06N 3/04 |
| 2019/0237061 | A1* | 8/2019 | Rusak | G10L 15/063 |
| 2019/0244601 | A1* | 8/2019 | Rusak | G10L 15/08 |
| 2019/0251744 | A1* | 8/2019 | Flagg | G06T 17/10 |
| 2019/0287229 | A1* | 9/2019 | Wang | G06T 3/4038 |
| 2019/0295017 | A1* | 9/2019 | Rakshit | G06N 3/08 |
| 2019/0295545 | A1* | 9/2019 | Andreas | G10L 15/1815 |
| 2019/0325628 | A1* | 10/2019 | Dubey | G06F 30/00 |
| 2019/0333284 | A1* | 10/2019 | Abunojaim | G06F 3/04845 |
| 2019/0385018 | A1* | 12/2019 | Ngodinh | A61B 1/31 |
| 2019/0385302 | A1* | 12/2019 | Ngodinh | A61B 1/31 |
| 2020/0027277 | A1* | 1/2020 | Woo | G06Q 30/0643 |
| 2020/0034948 | A1* | 1/2020 | Park | A61N 5/1039 |
| 2020/0051565 | A1* | 2/2020 | Singh | G10L 15/22 |
| 2020/0058137 | A1* | 2/2020 | Pujades | G06T 7/75 |
| 2020/0099954 | A1* | 3/2020 | Hemmer | H04N 19/597 |
| 2020/0118003 | A1* | 4/2020 | Owada | G06N 20/00 |
| 2020/0139631 | A1* | 5/2020 | Buller | B29C 64/393 |
| 2020/0151952 | A1* | 5/2020 | Aksit | G06N 3/084 |
| 2020/0160501 | A1* | 5/2020 | Liao | G06N 3/0481 |
| 2020/0160972 | A1* | 5/2020 | Beriault | G06N 3/08 |
| 2020/0167914 | A1* | 5/2020 | Stamatoyannopoulos | G06N 20/00 |
| 2020/0175757 | A1* | 6/2020 | Li | G06T 15/00 |
| 2020/0193298 | A1* | 6/2020 | Hilprecht | G06N 3/0454 |
| 2020/0202622 | A1* | 6/2020 | Gallo | G06K 9/6256 |

(56) References Cited

U.S. PATENT DOCUMENTS

| | | | |
|---|---|---|---|
| 2020/0210636 A1* | 7/2020 | Sanchez Bermudez | ................. G06T 17/10 |
| 2020/0210814 A1* | 7/2020 | Mehr | ............. G06N 3/088 |
| 2020/0210845 A1* | 7/2020 | Sanchez Bermudez | ................. G06T 17/20 |
| 2020/0211179 A1* | 7/2020 | Sun | ........ G06N 3/0472 |
| 2020/0226407 A1* | 7/2020 | Kendrick | ............. G06N 20/10 |
| 2020/0250540 A1* | 8/2020 | Mehr | ............. G06N 3/0454 |
| 2020/0250894 A1* | 8/2020 | Mehr | ............. G06T 17/10 |
| 2020/0273248 A1* | 8/2020 | Jørgensen | ............. G06T 9/002 |
| 2020/0285907 A1* | 9/2020 | Mehr | ............. G06K 9/00214 |
| 2020/0294309 A1* | 9/2020 | Kong | ............. G06V 10/82 |
| 2020/0302322 A1* | 9/2020 | Tukiainen | ............. G06N 3/0454 |
| 2020/0302667 A1* | 9/2020 | del Val Santos | ...... G06T 13/205 |
| 2020/0304804 A1* | 9/2020 | Habibian | ............. H04N 19/13 |
| 2020/0320777 A1* | 10/2020 | Meshry | ............. G06N 3/0454 |
| 2020/0327718 A1* | 10/2020 | Saragih | ............. G06T 15/20 |
| 2020/0334898 A1* | 10/2020 | Bae | ............. G06T 17/00 |
| 2020/0342968 A1* | 10/2020 | Avinash | ............. G06N 20/00 |
| 2020/0349482 A1* | 11/2020 | Grossman | ............. G06F 30/12 |
| 2020/0349698 A1* | 11/2020 | Minchenkov | ......... G06K 9/4628 |
| 2020/0352518 A1* | 11/2020 | Lyman | ............. A61B 5/7257 |
| 2020/0363815 A1* | 11/2020 | Mousavian | ......... G06K 9/00805 |
| 2020/0364895 A1* | 11/2020 | Bradski | ............. G06T 7/593 |
| 2020/0380229 A1* | 12/2020 | Peruch | ............. G06K 7/1447 |
| 2020/0380362 A1* | 12/2020 | Cao | ............. G06N 20/00 |
| 2020/0380720 A1* | 12/2020 | Dixit | ............. G06T 7/194 |
| 2020/0394499 A1* | 12/2020 | Yao | ............. G06N 5/022 |
| 2020/0402243 A1* | 12/2020 | Benou | ............. G06K 9/6289 |
| 2021/0004645 A1* | 1/2021 | Chaudhuri | ............. G06K 9/6257 |
| 2021/0004719 A1* | 1/2021 | Dupont De Dinechin | ................. G06N 3/0454 |
| 2021/0005013 A1* | 1/2021 | Mitchell | ............. G06T 17/00 |
| 2021/0005209 A1* | 1/2021 | Beack | ............. G06N 3/0481 |
| 2021/0012486 A1* | 1/2021 | Huang | ............. G06N 3/08 |
| 2021/0019598 A1* | 1/2021 | Rapsomaniki | ......... G06N 3/084 |
| 2021/0019928 A1* | 1/2021 | Borer | ............. G06F 17/15 |
| 2021/0026355 A1* | 1/2021 | Chen | ............. G01S 17/931 |
| 2021/0035347 A1* | 2/2021 | Casas | ............. G06T 13/40 |
| 2021/0042643 A1* | 2/2021 | Hong | ............. G06N 3/0454 |
| 2021/0042981 A1* | 2/2021 | Bisceglio | ............. G06T 13/40 |
| 2021/0046861 A1* | 2/2021 | Li | ............. B60Q 1/076 |
| 2021/0049467 A1* | 2/2021 | Riedmiller | ......... G06N 3/0445 |
| 2021/0056348 A1* | 2/2021 | Berlin | ............. G06K 9/6256 |
| 2021/0064792 A1* | 3/2021 | Kim | ............. G06F 30/12 |
| 2021/0073995 A1* | 3/2021 | Yang | ............. G06N 3/006 |
| 2021/0074036 A1* | 3/2021 | Fuchs | ............. G06K 9/6232 |
| 2021/0090247 A1* | 3/2021 | Jeon | ............. G06V 10/82 |
| 2021/0097759 A1* | 4/2021 | Agrawal | ............. G16H 15/00 |
| 2021/0103776 A1* | 4/2021 | Jiang | ............. G06T 15/20 |
| 2021/0110018 A1* | 4/2021 | Rowe | ............. G06V 40/172 |
| 2021/0110457 A1* | 4/2021 | Polan A Cabrera | ..... G06N 3/08 |
| 2021/0118129 A1* | 4/2021 | Kearney | ............. G06T 7/0012 |
| 2021/0133788 A1* | 5/2021 | Jacobs | ............. G06Q 10/0637 |
| 2021/0133990 A1* | 5/2021 | Eckart | ............. G06K 9/6226 |
| 2021/0138655 A1* | 5/2021 | Mousavian | ......... G05B 19/4155 |
| 2021/0146531 A1* | 5/2021 | Tremblay | ............. G06N 3/08 |
| 2021/0150341 A1* | 5/2021 | Dalli | ............. G06N 5/003 |
| 2021/0150770 A1* | 5/2021 | Appu | ............. G06N 3/0445 |
| 2021/0150771 A1* | 5/2021 | Huang | ............. G06T 17/005 |
| 2021/0153986 A1* | 5/2021 | Wirjadi | ............. G06T 17/10 |
| 2021/0158550 A1* | 5/2021 | Karanam | ............. G16H 50/20 |
| 2021/0158607 A1* | 5/2021 | Katzman | ............. G06T 7/50 |
| 2021/0166477 A1* | 6/2021 | Bunkasem | ............. G06V 10/776 |
| 2021/0241106 A1* | 8/2021 | Mehr | ............. G06N 3/088 |
| 2021/0241521 A1* | 8/2021 | Zhe | ............. G06T 13/80 |
| 2021/0248811 A1* | 8/2021 | Shan | ............. G06T 3/608 |
| 2021/0264079 A1* | 8/2021 | Mehr | ............. G06F 30/23 |
| 2021/0279943 A1* | 9/2021 | Murez | ............. G06N 3/082 |
| 2021/0319302 A1* | 10/2021 | Li | ............. G06K 9/6223 |
| 2021/0345970 A1* | 11/2021 | El-Baz | ............. G16H 30/40 |
| 2021/0350620 A1* | 11/2021 | Bronstein | ............. G06N 3/04 |
| 2021/0350621 A1* | 11/2021 | Bailey | ............. G06T 3/4046 |
| 2021/0358212 A1* | 11/2021 | Vesdapunt | ............. G06T 19/20 |
| 2021/0402942 A1* | 12/2021 | Torabi | ............. G06N 3/02 |
| 2022/0005150 A1* | 1/2022 | Ye | ............. G06T 3/0068 |
| 2022/0005268 A1* | 1/2022 | Gruber | ............. G06T 17/00 |
| 2022/0012566 A1* | 1/2022 | Korsunsky | ............. G06N 3/0472 |
| 2022/0051094 A1* | 2/2022 | Chentanez | ............. G06N 3/0454 |
| 2022/0051479 A1* | 2/2022 | Agarwal | ............. G06N 3/04 |
| 2022/0103839 A1* | 3/2022 | Van Rozendaal | ...... H04N 19/90 |
| 2022/0121554 A1* | 4/2022 | Das | ............. G06F 11/3608 |

OTHER PUBLICATIONS

Z.-Q. Cheng et al., "Non-rigid Registration in 3D Implicit Vector Space," 2010 Shape Modeling International Conference, 2010, pp. 37-46, doi: 10.1109/SMI.2010.21. (Year: 2010).*

Veltkamp, R.C. and Wesselink, W. (1995), Modeling 3D Curves of Minimal Energy. Computer Graphics Forum, 14: 97-110. https://doi.org/10.1111/j.1467-8659.1995.cgf143_0097.x (Year: 1995).*

Willimon et al., "An energy Minimization Approach to 3D Non-Rigid Deformable Suface Estimation Using RGBD Data", arXiv, 2017. (Year: 2017).*

Yoshua Bengio; "Learning Deep Architectures for AI"; Dept. IRO, Universite De Montreal; to Appear in Foundations and Trends in Machine Learning; http://www.iro.umontreal.ca/-bengioy; 2009; 71 pgs.

Andrew Brook, et al.; "Neural Photo Editing with Introspective Adversarial Networks"; Published as a Conference Paper at ICLR 2017; arXiv: 1609.07093v3 [cs.LG]; Feb. 6, 2017; 15 pgs.

Ian J. Goodfellow, et al.; "Generative Adversarial Nets"; Departement D'Informatique et de Recherche Operationnelle; Universite De Montreal, Montreal, QC H3C 3J7, Published in NIPS; 2014; 9 pgs.

G. E. Hinton, et al.: "Reducing the Dimensionality of Data with Neural Networks"; Science; vol. 313; Jul. 28, 2006; www.sciencemag.org; 4 pgs.

Diederik P. Kingma, et al.; "Auto-Encoding Variational Bayers"; arXiv: 1312.6114v10 [stat.ML]; May 1 2014; 14 pgs.

Hao Li, et al.; "Global Correspondence Optimization for Non-Rigid Registration of Depth Scans"; Eurographics Symposium on Geometry Processing 2008; vol. 27, No. 5, 2008; 10 pgs.

Jerry Liu, et al.; "Interactive 3D Modeling with a Generative Adversarial Network"; arxiv.org; Cornell University Library, 201 Olin Library Cornell University Ithaca, NY 14653; Jun. 16, 2017; XP080770287; 11 pgs.

Danilo J. Rezende, et al.; "Stochastic Backpropagation and Approximate Inference in Deep Generative Models"; arXiv: 1401.4082v3 [stat.ML]; May 30, 2014; 14 pgs.

Pascal Vincent, et al.; "Stacked Denoising Autoencoders: Learning Useful Representations in Deep Network with a Local Denoising Criterion"; Journal of Machine Learning Research 11; 2010; 36 pgs.

Jun-Yan Zhu, et al.; "Generative Visual Manipulation on the Natural Image Manifold"; arXiv:1609.03552V3 [cs.CV], Dec. 16, 2018; 16 pgs.

Qingyang Tan, et al.; "Mesh-Based Autoencoders for Localized Deformation Component Analysis"; arXiv: 1709.04304v1 [cs.GR]; Sep. 13, 2017, 9 pgs.

M. Ersin Yumer, et al.; "Learning Semantic Deformation Flows with 3D Convolutional Networks"; Proc. Int. Conf. Adv. Biometrics (ICB); Lecture Notes in Computer Science; Letc. Notes Computer; Sep. 17, 2016; ISBN: 978-3-642-17318-9; [Retrieved on May 17, 2016]; 11 pgs.

Qingyang Tan, et al.; "Variational Autoencoders for Deforming 3D Mesh Models"; 2018 IEEE/CVF Conference on Computer Vision and Pattern Recognition , IEEE; Jun. 18, 2018; XP033473499; 11 pgs.

Extended Search Report dated Apr. 3, 2019 in Europe Patent Application No. 18306758.6-1230; 11 pgs.

* cited by examiner

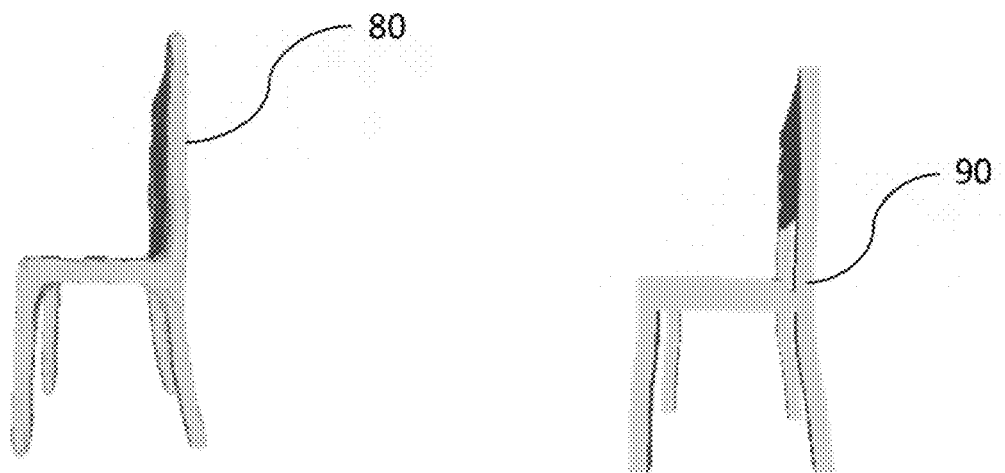
FIG. 8  FIG. 9
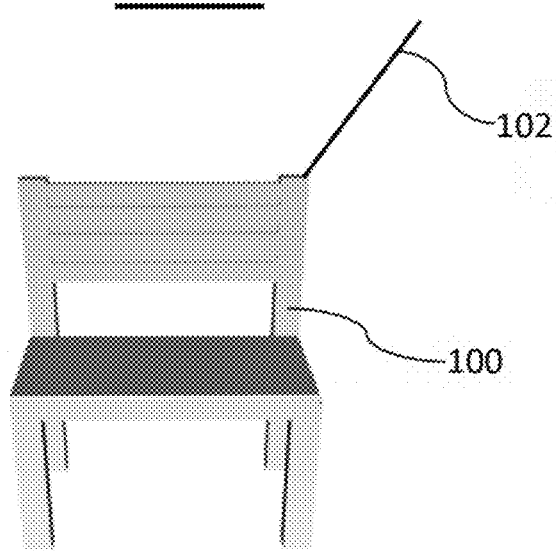 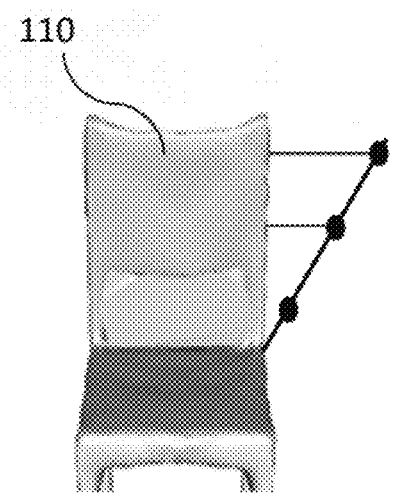
FIG. 10  FIG. 11

DESIGNING A 3D MODELED OBJECT VIA USER-INTERACTION

CROSS-REFERENCE TO RELATED APPLICATIONS

This application claims priority under 35 U.S.C. § 119 or 365 to European Application No. 18306758.6, filed Dec. 20, 2018. The entire contents of the above application(s) are incorporated herein by reference.

FIELD OF THE INVENTION

The disclosure relates to the field of computer programs and systems, and more specifically to a method, system and program for designing a 3D modeled object via user-interaction.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context and other contexts, machine-learning and in particular autoencoder and/or manifold learning is gaining wide importance.

The following papers relate to this field and are referred to hereunder: [1]: "Stacked Denoising Autoencoders: Learning Useful Representations in a Deep Network with a Local Denoising Criterion", P. Vincent, H. Larcohelle, I. Lajoie, Y. Bengio, P. Manzagol, in The Journal of Machine Learning Research, 2010.

[2]: "Reducing the Dimensionality of Data with Neural Networks", G. E. Hinton, R. R. Salakhutdinov, in Science, 2006.

[3]: "Learning Deep Architectures for AI", Y. Bengio, in Foundations and Trends in Machine Learning, 2009.

[4]: "Generative Adversarial Nets", I. Goodfellow, J. Pouget-Abadie, M. Mirza, B. Xu, D. Warde-Farley, S. Glair, A. Courville, Y. Bengio, in Advances in Neural Information Processing Systems, 2014.

[5]: "Generative Visual Manipulation on the Natural Image Manifold", J-Y Zhu, P. Krähenbühl, E. Shechtman, A. A. Efros, in ECCV 2016.

[6]: "Neural Photo Editing with Introspective Adversarial Networks", A. Brock, T. Lim, J. M. Ritchie, in ICLR 2017.

Given a dataset representing samples from a same class, for example a dataset of images of chairs, or a dataset of 3D models of cars, autoencoders (explained in [1,2]) aims at learning a mapping between the original input space of this dataset and a low-dimensional space, often called latent space. Moreover, autoencoders also learn a reverse mapping from the latent space to the original input space. They may be used to do realistic non-linear interpolation in the original spaces, extract meaningful features in the data, compress the data into a compact representation, etc.

Paper [4] introduces a generative adversarial network, a model which learns a decoder, but also sets a probabilistic prior on the latent space to learn the distribution of the data. To do so, they train the decoder in order to fool a discriminator, whereas the discriminator is trained to classify between real data and synthetized data. One can also teach an encoder to project the data onto the latent space, using a reconstruction error like autoencoders.

Paper [5] learns a generative adversarial network on images. The modifications are finally retargeted onto the original image with optical flow. Paper [6] also proposes an edition system onto images, by learning an introspective adversarial network, a hybridization between a variational autoencoder and a generative adversarial network, but they retarget the user modifications with masking techniques instead of optical flow.

However, the use of machine-learning techniques in the context of (e.g. 3D) design remains an uncommon and relatively unknown approach.

Within this context, there is still a need for an improved method for designing a 3D modeled object via user-interaction.

SUMMARY OF THE INVENTION

It is therefore provided a computer-implemented method for designing a 3D modeled object via user-interaction. The method comprises providing the 3D modeled object and a machine-learnt decoder. The machine-learnt decoder is a differentiable function taking values in a latent space and outputting values in a 3D modeled object space. The method further comprises defining, by a user, a deformation constraint for a part of the 3D modeled object. The method further comprises determining an optimal vector. The optimal vector minimizes an energy.

The energy explores latent vectors. The energy comprises a term which penalizes, for each explored latent vector, non-respect of the deformation constraint by the result of applying the decoder to the explored latent vector. The method further comprises applying the decoder to the optimal latent vector.

Such a method constitutes an improved method for designing a 3D modeled object via user-interaction.

Notably, the method makes use of a machine-learnt decoder in the context of designing a 3D modeled object via user-interaction.

Furthermore, the user defines a deformation constraint for a part of the 3D modeled object. In other words, the user provides a design intent of which purpose is to deform the 3D modeled object. The method then determines the optimal latent vector, which is a vector minimizing an energy that penalizes non-respect of the deformation constraint on the latent vector space. In other words, the determined optimal latent vector is a vector of the latent space tending to respect the deformation constraint. In examples, the optimal latent vector respects (e.g. optimally) the deformation constraint. The optimal latent vector is then decoded into an element of the 3D modeled object space, in other words, the method finds a 3D modeled object which tends to respect (e.g. respects, e.g. optimally) the deformation constraint provided by the user. Hence, the method allows to find a 3D modeled object which tends to respect (e.g. respects) the user's design intent. Moreover, the determining of the optimal latent vector and the applying of the decoder to the optimal latent vector may be carried out automatically, thus without involving user actions, as a result of the providing of the deformation constraint by the user. Thus, not only does the method output a 3D modeled object tending to respect the user's design intent, but the method does so with few user-machine interactions. The method is thus efficient and ergonomic.

Also, the decoder may output only plausible 3D modeled objects because the decoder may have been machine-learnt to do so. For example, the 3D modeled object space may be a space of plausible 3D modeled objects. In other words, the method may output a plausible 3D modeled object tending to respect the user's design intent in an ergonomic and efficient way.

The method may comprise one or more of the following:
the deformation constraint defines a geometrical shape and the term penalizes a disparity between the result of applying the decoder to the explored latent vector and the geometrical shape;
the disparity involves a distance between a derivative of the result of applying the decoder to the explored latent vector and the geometrical shape;
the geometrical shape is defined in a 3D space and the derivative is the result of applying the decoder to the explored latent vector;
the geometrical shape is defined in a 2D plane and the derivative is a projection of the result of applying the decoder to the explored latent vector;
the disparity is a monotonic function of the distance;
the 3D modeled object is a 3D mesh and when the geometrical shape is defined in a 3D space and the derivative is the result of applying the decoder to the explored latent vector, the term is of the type:

$$\Sigma_{i=1}^{k}[\Sigma_{j=1}^{M}\rho(\|g(z)_{v_i}-g(z)_j\|)\|g(z)_j-y_j\|_2^2], \text{ where}$$

z is the explored latent vector;
g(z) is the result of applying the decoder to the explored latent vector;
$v_1, v_2, \ldots, v_k$ are the indices of k vertices of g(z) representing the part of the 3D modeled object;
M is a sampling size of the 3D modeled object;
$\rho$ is a non-negative and non-increasing function;
y is the geometrical shape;
the 3D modeled object is a 3D mesh and when the geometrical shape is defined in a 2D plane and the derivative is a projection of the result of applying the decoder to the explored latent vector, the term is of the type:

$$\sum_{s \in S} \min_{j=1,\ldots,M} \|P[g(z)_j] - s\|_2^2,$$

where
z is the explored latent vector;
M is a sampling size of the 3D modeled object;
S is a set of pixel coordinates of the geometrical shape;
g(z) is the result of applying the decoder to the explored latent vector;
P is the projection;
computing a deformation operation, from the result of applying the decoder to the projection of the 3D modeled object onto the latent space, to the result of applying the decoder to the optimized latent vector and applying the deformation operation to the 3D modeled object.
the machine-learnt decoder is the decoder of an autoencoder that also comprises an encoder;
the determining of the optimal latent vector rewards similarity between the result of applying the decoder to the explored latent vector and the 3D modeled object;
the determining of the optimal latent vector is performed iteratively, starting from a first explored latent vector which is the result of applying the encoder to the 3D modeled object;
the energy comprises another term that rewards similarity between the explored latent vector and the result of applying the encoder to the 3D modeled object;
the other term involves a distance between the explored latent vector and the result of applying the encoder to the 3D modeled object; and/or
the energy comprises another term which rewards a likelihood of the explored latent vector on the latent space.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments of the disclosure will now be described, by way of non-limiting example, and in reference to the accompanying drawings, where:
FIGS. 2, 3, 4, 5, 6, 7, 8, 9, 10, 11, 12 and 13 illustrate the method.

DETAILED DESCRIPTION OF THE INVENTION

Figure 1:
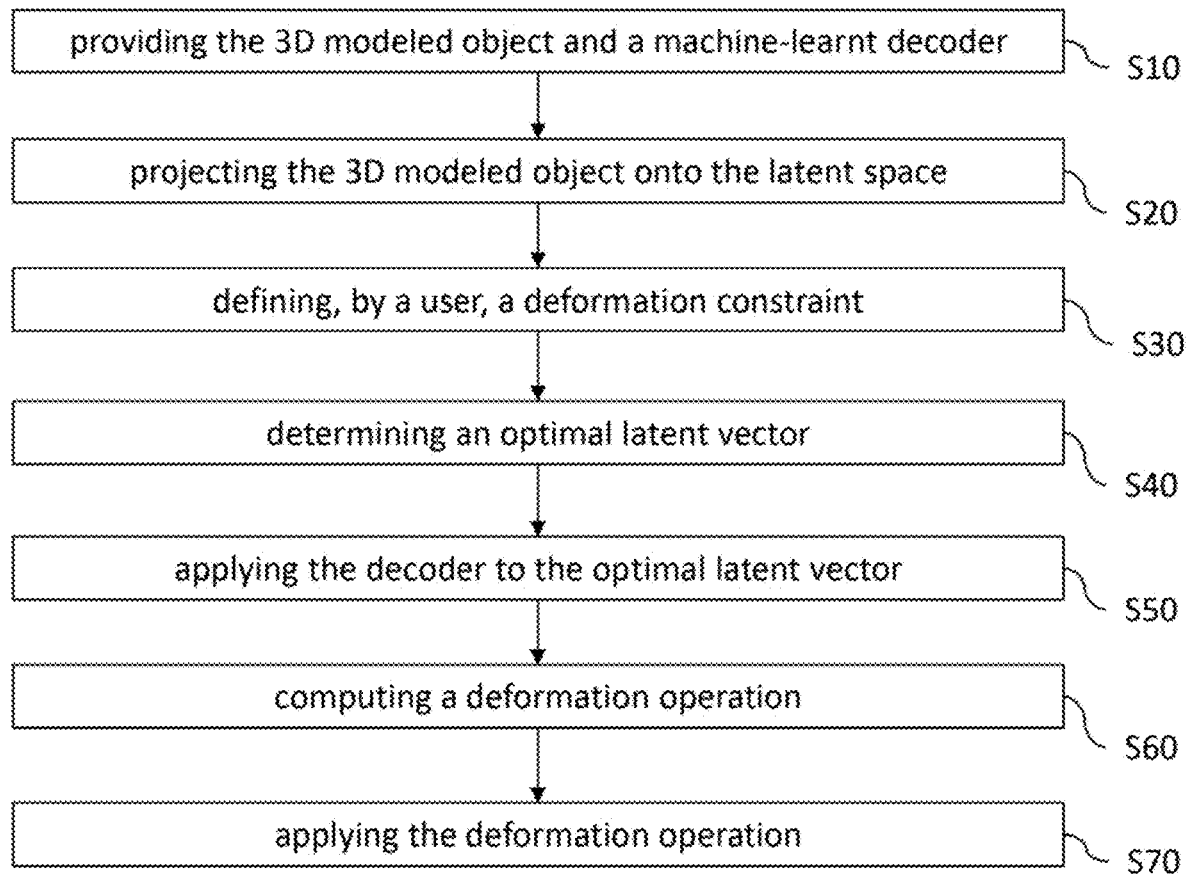
FIG. 1 shows a flowchart of an example of the method.

With reference to the flowchart of FIG. 1, it is proposed a computer-implemented method for designing a 3D modeled object via user-interaction. The method comprises providing S10 the 3D modeled object and a machine-learnt decoder. The machine-learnt decoder is a differentiable function taking values in a latent space and outputting values in a 3D modeled object space. The method further comprises defining S30, by a user, a deformation constraint for a part of the 3D modeled object. The method further comprises determining S40 an optimal vector. The optimal vector minimizes an energy. The energy explores latent vectors. The energy comprises a term which penalizes, for each explored latent vector, non-respect of the deformation constraint by the result of applying the decoder to the explored latent vector. The method further comprises applying S50 the decoder to the optimal latent vector.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PIM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. nonuniform rational B-splines (NURBS). Specifically, a CAD file contains specifications, from which geometry may he generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

The concept of "3D modeled object" involved in the method is now discussed. In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

In the context of the method, the 3D modeled object may represent the geometry of a product to be manufactured in the real world subsequent to the completion of its virtual design with for example a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

In examples, any 3D modeled object designed by the method and/or involved in the method may represent a mechanical part which is one or a plausible combination of a molded part (i.e. a part manufactured by a molding manufacturing process), a machined part (i.e. a part manufactured by a machining manufacturing process), a drilled part (i.e. a part manufactured by a drilling manufacturing process), a turned part (i.e. a part manufactured by a turning manufacturing process), a forged part (i.e. a part manufactured by a forging manufacturing process), a stamped part (i.e. a part manufactured by a stamping manufacturing process) and/or a folded part (i.e. a part manufactured by a folding manufacturing process).

Any 3D modeled object designed by the method and/or involved in the method may be a plausible (e.g. realistic) 3D modeled object. A plausible 3D modeled object may designate a 3D modeled object representing a plausible (e.g. realistic) mechanical part. A plausible mechanical part may designate a mechanical part realistically manufacturable in a real-world industrial manufacturing process. A plausible mechanical part may refer to a mechanical part which respects all the constraints that must be respected in order to realistically manufacture the mechanical part in a real-world industrial manufacturing process. The constraints may comprise one or any plausible combination of the following: mechanical constraints (e.g. constraints resulting from the laws of classic mechanics), functional constraints (e.g. constraints relative to one or more mechanical functions to be performed by the mechanical part once manufactured), manufacturing constraints (e.g. constraints pertaining to the ability of applying one or more manufacturing tools to the mechanical part during one or more manufacturing processes for manufacturing the mechanical part), structural constraints (e.g. constraints pertaining to the strength and/or resistance of the mechanical part) and/or assembly constraints (e.g. constraints defining how the mechanical part can be assembled with one or more other mechanical parts).

"Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

The providing S10 of the 3D modeled object is now discussed.

The providing of the 3D modeled object may comprise displaying the 3D modeled object on a display of a computer such as a CAD system. The providing of the 3D modeled object may result from an action of a user, e.g. an interaction between the user and the computer. In examples, the 3D modeled object may have been designed by an another user on another computer and optionally stored in a memory and/or sent (e.g. through a network) to the computer. The providing of the 3D modeled object may comprise retrieving the 3D modeled object from a memory. In examples, the user and the another user are different, and the computer and the another computer are different. In these examples, the computer and the another computer may be connected by a network. In examples, the user and the another user are the same, and the computer and the another computer are the same.

The 3D modeled object may be provided S10 as a mesh or as a point cloud. Alternatively, the providing S10 may comprise providing the 3D modeled object in any format (e.g. as a AD file) and meshing the 3D modeled object and/or determining (e.g. inferring, e.g. extracting, e.g. computing), from the (e.g. meshed) 3D modeled object, a point cloud representing the 3D modeled object.

The machine-learnt decoder is now discussed.

The machine-learnt decoder is a differentiable function. The function is machine-learnt. The function takes is values in a latent space. The latent space is a vector space. The function outputs values in a 3D modeled object space, i.e. a space comprising (e.g. made of) 3D modeled objects. In other words, applying the function to vectors of the latent space (hereinafter referred to as "latent vectors") outputs 3D modeled objects. In other words, the image of each latent vector by the function is a 3D modeled object of the 3D modeled object space. The image of the latent space by the function may be the 3D modeled object space or a strict subset of the 3D modeled object space. Decoding a latent vector means applying the decoder to the latent vector. The result of the decoding may thus be referred to as "the decoded latent vector". In examples, the latent space features a probabilistic prior. In other words, a probabilistic prior, which may be denoted p(z) in the following, may be given over the latent space z being a notation for a vector of the latent space. In these examples, the prior may be an r priori probability distribution expressing how the latent vectors are distributed over the latent space. A priori means that the probability distribution may be determined (e.g. computed, e.g. established) without having complete knowledge of the latent space. For example, the prior over the latent space may be inferred (e.g. deduced) from an existing (e.g. probability) distribution of the 3D modeled objects over the 3D modeled object space, such that the prior expresses a distribution of the latent vectors over the latent space that (e.g. substantially) corresponds to the distribution of the 3D modeled objects over the 3D modeled object space.

The machine-learnt decoder may be the decoder of an autoencoder. In the context of the method, an autoencoder may be defined as the composition of two feedforward deep neural networks (see [3]) $f_w: \mathbb{R}^m \to \mathbb{R}^p$ r and $g_{w'}: \mathbb{R}^p \to \mathbb{R}^m$, parameterized by the weights w and w', where p»m. $f_w$ is the encoder, and $g_{w'}$, the decoder. $\mathbb{R}^p$ is the latent space, i.e. the vector space where the encoder $f_w$ outputs its values and where the decoder $g_{w'}$, takes its values. p is the dimension of the latent space. $\mathbb{R}^m$ is the space where the encoder $f_w$ takes its values and where the decoder $g_{w'}$, outputs its values. $\mathbb{R}^m$ may be referred to as "the original input space". m is the dimension of the original input space. In the case of the machined-learnt decoder provided by the method, the original input space may be the 3D modeled object space. Alternatively, the 3D modeled object space may be a subset of the original input space. In other words, the encoder $f_w(x)$ takes its values in the original input space, but the image of the latent space by the decoder $g_{w'}$, i.e. the 3D modeled object space in the context of the method, may be a subset of the original input space. A vector $z=f_w(x)$ may be referred to as "a latent vector" or "a hidden vector". The autoencoder $g_{w'} \circ f_w(x)$ may also be referred to as "a reconstruction". The reconstruction takes as input a first element of the original input space (for example, a first 3D modeled object of the 3D modeled object space), maps it onto a latent vector of the latent vector space, and then reverse the mapping by outputting a second element of the original input space (for example, a second 3D modeled object of the 3D modeled object space) from the latent vector. The second element may be referred to as "a reconstruction" of the first element. In examples it means that the second element represents an approximation of the first element. In examples, if x is a 3D modeled object, the 3D modeled object $g_{w'} \circ f_w(x)$ may be referred to as the reconstructed 3D modeled object. x may also be referred to as the input and $g_{w'} \circ f_w(x)$ as the reconstructed input. In the context of the method, the encoder $f_w$, and the decoder $g_w$ may be machined-learnt (e.g. separately or simultaneously), e.g. by minimizing a reconstruction error. Encoding an object means applying the encoder to the object. The result of the encoding may thus be referred to as "the encoded object". Decoding a latent vector means applying the decoder to the latent vector. The result of the decoding may thus be referred to as "the decoded latent vector".

The providing S10 of the machine-learnt decoder is now discussed.

The providing S10 of the machine-learnt decoder may comprise retrieving the machine-learnt decoder from a database. In other words, the machine-learnt decoder may have been previously learnt and stored in a database for later use. In examples, the providing S10 of the machine-learnt decoder may be carried out by a user which accesses the decoder in a database. Additionally or alternatively, the providing S10 may comprise learning the decoder from scratch and making it available for use by the method.

The 3D modeled object space is now discussed.

The 3D modeled object space generally refers to a space made of 3D modeled objects. The 3D modeled object space may be included in a vector space. In examples, the 3D modeled object space is a manifold, for example a connected manifold, of a vector space. In examples, the 3D modeled object space is made of 3D modeled objects of a same class of 3D modeled objects. A class of 3D modeled objects may correspond to a connected manifold of a vector space. Additionally or alternatively, a class of 3D modeled objects may designate a set of 3D modeled objects which has a the following property: any first 3D modeled object of the set is similar to, e.g. has a shape similar to, at least a second 3D modeled object of the set.

In examples, the class of 3D modeled object is made of 3D modeled object representing respective mechanical parts, the mechanical parts relative (i.e.

corresponding) to the class all respecting any one or any combination of the following conditions:
- the mechanical parts relative to the class are all manufactured in the same manufacturing process or in the same combination of manufacturing processes;
- the mechanical parts relative to the class are all plausible mechanical parts;
- the mechanical parts relative to the class are all from a same field of technology and/or industry;
- the mechanical parts relative to the class all perform a same mechanical function;
- the mechanical parts relative to the class each being represented by a 3D modeled object which has a shape similar to at least one other 3D modeled object of the class (thus representing another mechanical part relative to the class); and/or
- the mechanical parts relative to the class all obey to (e.g. satisfy, e.g. respect e.g. verify) same mechanical constraints, functional constraints, manufacturing constraints, structural constraints and/or assembly constraints.

In examples, the provided 3D modeled object and (e.g. substantially) all the 3D modeled objects of the 3D modeled object space are 3D modeled objects of a same class of 3D modeled objects. In these examples, the decoder may have been machine-learnt based on a dataset of 3D modeled objects of said same class. For example, the decoder may have been machine-learnt to map any latent vector onto a 3D modeled object of said same class. In examples, the decoder may be the decoder of an autoencoder that further comprises an encoder, the decoder and the encoder having both being machine-learnt based on a dataset of 3D modeled objects of said same class. In these examples, the encoder may have been machine-learnt to map any 3D object of said same class onto a latent vector of the latent is space. In these examples, the decoder may have been machine-learnt to map any latent vector onto a 3D modeled object of said same class. In examples, all modeled object of the 3D modeled object space are plausible 3D modeled objects.

Figure 2:
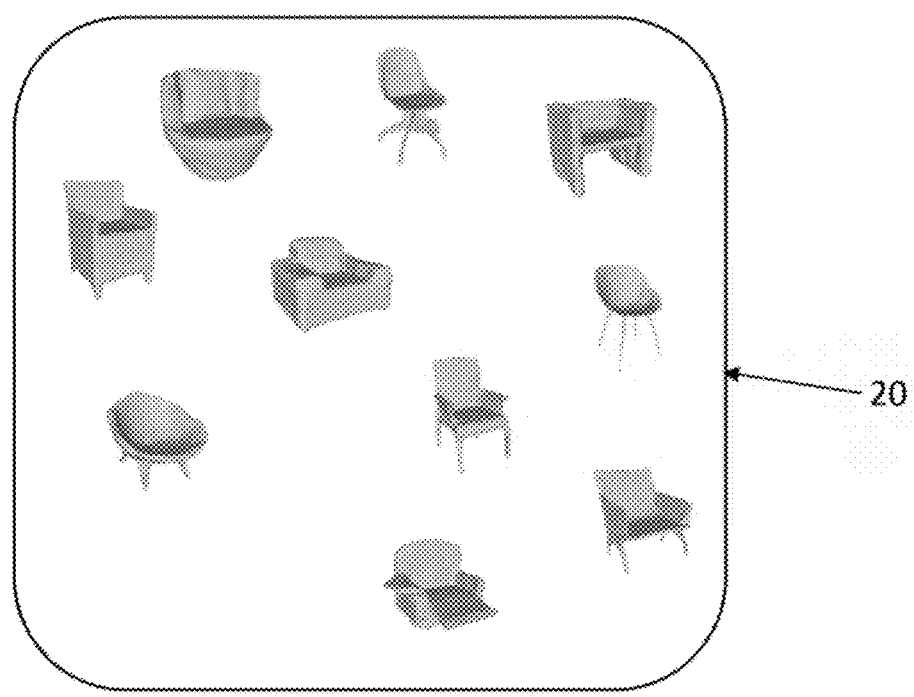

FIG. 2 shows a class of 3D modeled objects forming an example of the set 20 of 3D modeled object of the method. The 3D modeled objects are chairs. The chairs form a class of 3D modeled object because they all perform the same mechanical function, which is supporting a weight (e.g. of a human being). Performing this mechanical function also means that the chairs all obey to same mechanical constraints, functional constraints and structural constraints. The chairs of FIG. 2 are plausible mechanical parts, because they respect mechanical constraints, functional constraints, manufacturing constraints and structural constraints, thereby allowing their manufacturing in the real-world by one or more manufacturing process.

Figure 3:
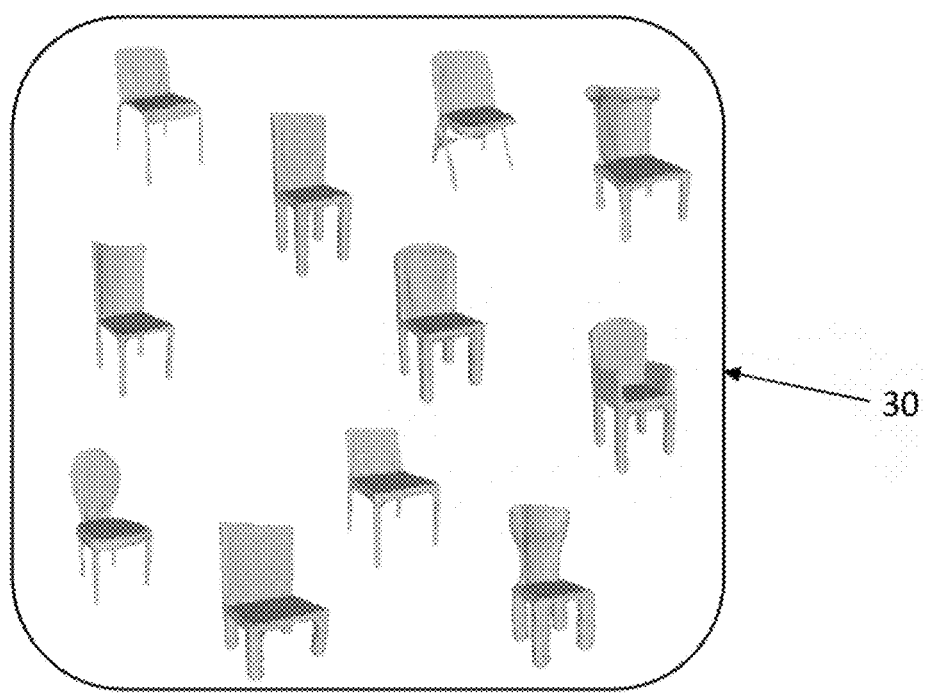

FIG. 3 shows a class of 3D modeled objects forming an example of the set 30 of 3D modeled object of the method. The 3D modeled objects are chairs with four legs (each). The chairs with four legs form a class of 3D modeled object because they all perform the same mechanical function, which is supporting a weight (e.g. of a human being), and because performing this mechanical function with four legs also means that the chairs all obey to same mechanical constraints, functional constraints and structural constraints. The chairs of FIG. 3 are plausible mechanical parts, because they respect mechanical constraints, functional constraints, manufacturing constraints and structural constraints, thereby allowing their manufacturing in the real-world by one or more manufacturing process.

The 3D modeled object space may be a space made of discrete representations of 3D modeled objects, such as meshes and/or point clouds. In other words, the 3D modeled object space is made of respective discrete representations (such as meshes and/or point clouds) of 3D modeled objects of the space. In such cases, the elements of the 3D modeled object space may still be referred to as the 3D modeled objects themselves, and not their respective discrete representations, for the sake of simplicity.

In examples, the method comprises projecting S20 the 3D modeled object onto the latent space. In these examples, the machine-learnt decoder may be the decoder of a machine-learnt autoencoder also comprising a machine-learnt encoder. Projecting S20 the 3D modeled object may consist in applying the encoder to the 3D modeled object, the applying of the encoder to the 3D modeled object resulting in a latent vector. The latent vector may be called the projection of the 3D modeled object on the latent space. Alternatively, the providing S10 of the 3D modeled object may comprise providing, besides the 3D modeled object, the latent vector which is the result of applying the encoder to the 3D modeled object. In any case, the projecting S20 may result in that a latent vector which is the projection of the 3D modeled object onto the latent space is made available for further use in the method, as discussed herein after.

The part of the 3D modeled object is now discussed.

In examples, any 3D modeled objects designed by the method or involved in the method may be divided into parts. For a 3D modeled object representing a mechanical part, a part of the 30 modeled object may designate a layout of material of the mechanical part, the layout of material performing a mechanical function. In other words, the 30 modeled object representing the mechanical part may be divided into parts each representing a respective layout of material of the mechanical parts, the respective layout of material performing a respective mechanical function. In the context of the disclosure, a function performed by a layout of material of a mechanical part may be one or a plausible combination of a supporting function, a strengthening function, a resistance function, a connecting function between other layouts of material, a mass reduction function, a space reservation function, a fixture function, a tightness function, an adjustment function, a positioning function, a mechanical joint function, a cooling function, a space reservation function, a revolute or cylindrical mechanical joint function, an assembly function, a stiffening function, a positioning pin function, a revolute or cylindrical mechanical joint function and/or a support for all machined and drilled protrusions function.

For example, a leg of a chair, such as a leg of any one of the chairs represented in FIG. 2 or FIG. 3, is a layout of material of the chair performing a supporting function. In other words, the leg of the chair is involved (e.g. as well as other legs) in performing the function of supporting the weight of further material forming the chair as well as the weight of a human sitting on the chair.

Another example is a (e.g. bent) chair back, such as a chair back of any one of the chairs represented in FIG. 2 or FIG. 3. The chair back is a layout of material of the chair performing a supporting function. In other words, the chair back is involved in performing the function of supporting the back of a human sitting on the chair.

Another example is a chair seat, such as a chair seat of any one of the chairs represented in FIG. 2 or FIG. 3. The chair seat is a layout of material of the chair performing a supporting function. In other words, the chair seat is involved in performing the function of supporting the weight of further material forming the chair as well as the weight of a human sitting on the chair. The chair seat also performs a connecting function, since it connects other parts of the chair such as the chair back and/or the chair legs.

Other examples of 3D modeled objects are now discussed.

Any 3D modeled object involved in the method may represent a car. In such a case, the part of the 3D modeled object may represent a wheel of the car (performing a supporting function as well as the function of rolling and/or turning) or a part of the car body (performing a connecting function and/or a resistance function and/or a strengthening function) such as a door, a hood, or a deck lid. Cars may form a class of 3D modeled objects. Alternatively or additionally, any 3D modeled object involved in the method may represent a plane. In such a case, the part of the 3D modeled object may represent a wing of the plane (performing a function of producing lift while moving through a fluid) or an engine of the plane (performing a function of producing force to move the plane) or the fuselage of the plane (performing a connecting function and/or a resistance function and/or a strengthening function). Planes may form a class of 3D modeled objects.

The defining S30 of the deformation constraint for the part of the 3D modeled object is now discussed.

The deformation constrain is defined S30 by a user, i.e. may result from a user action. The deformation constraint may designate a set of (e.g. geometric) specifications that determine a deformation (e.g. a transformation, e.g. a displacement) of a geometrical shape of the part of the 3D modeled object into another geometrical shape (which may be referred to as "the new geometrical shape" in the following). In other words, the deformation may not be directly defined by the user, but the user action rather results in specifications forcing the deformation. In examples, it means that the user provides (e.g. declares, e.g. specifies), e.g. by using a keyboard and/or a touch and/or a haptic device, the set of specifications. Alternatively, the set of specifications may be (e.g. automatically) retrieved from a user action on (e.g. the part of) the 3D modeled object.

Alternatively, the set of specifications may be (e.g. automatically) retrieved from a drawing of the user on a screen comprising the 3D modeled object. The deformation defined by the deformation constraint may thus deform the 3D modeled object into a deformed 3D modeled object by deforming the geometrical shape of the part into the new geometrical shape.

In examples, the defining S30 of the deformation constraint results from a graphical-interaction of the user with the part of the 3D modeled object. The graphical-interaction may comprise clicking on the 3D modeled object, e.g. with a haptic device such as a mouse, or touching the 3D modeled object with an appendage such as a finger. The graphical-interaction may further comprise moving the clicked on or touched 3D modeled object, for example by performing a drag and drop operation. For example, the user selects one or more points on the part of the 3D modeled object, e.g. by clicking on the one or more points with a haptic device such as a mouse and moves them by a drag and drop operation (e.g. moves them one by one by one or through a one-shot drag and drop operation), as known in the art. The respective one or more locations of the moved one or more points determine (e.g. form, e.g. result in) the new geometrical shape of the part of the 3D modeled object. In other words, the 3D modeled object has a given geometrical shape at the providing S10, and the user defines the new geometrical shape by moving the points. The deformation of the given geometrical shape into the new geometrical shape is thus constrained by the respective one or more locations of the one or more points moved by the user. In other words, moving the one or more points defines the new geometrical shape of the part and the new geometrical shape of the part defines the deformation constraint.

Alternatively, the user may define the deformation constraint by drawing (e.g. by using a haptic device) a 2D drawing (e.g. on a display) which represents the new geometrical shape for the part of the 3D modeled object, which has a given geometrical shape at the providing 510. The deformation of the given geometrical shape into the new geometrical shape is thus constrained by the drawing of the user. In other words, the drawing of the user defines the new geometrical shape of the part and the new geometrical shape of the part defines the deformation constraint.

The determining S40 of the optimal latent vector is now discussed.

The optimal latent vector minimizes an energy. Thus, the determining S40 of the latent vector may consist in minimizing the energy, the optimal latent vector being the result of the minimizing. The energy explores latent vectors. In examples, this means that the energy is a function of at least a variable representing latent vectors, i.e. the at least one variable belongs to the latent space or to a subspace of the latent space. Minimizing the energy may be carried out iteratively, i.e. by iteratively visiting latent vectors of at least a subspace of the latent space until (e.g. an approximation of) the latent vector minimizing the energy (i.e. the optimal latent vector) is found. Minimizing the energy may be carried out automatically upon the defining S30 the deformation constraint. Minimizing the energy may be carried out by running any minimization algorithm, such as an iteratively reweighted least squares algorithm.

The energy comprises a term which, penalizes, for each explored latent vector, non-respect of the deformation constraint by the result of applying the decoder to the explored latent vector. In examples where the energy is a function of at least a variable representing latent vectors, the term may depend on the at least variable and may provide a measure (e.g. a quantification) of the non-respect of the deformation constraint by the result of applying the decoder to the at least variable. In these examples, penalizing may mean that the term is an increasing function of the largeness of the measure.

The method thus determines an optimal latent vector by exploring latent vectors and verifying that the decoded latent vectors (i.e. the results of applying the decoder to the explored latent vectors) respect or do not respect the deformation constraint. Non-respect is penalized, such that the decoder optimal latent vector tends to respect (e.g. respects) the deformation constraint. The decoded latent vector may be a plausible 3D modeled object, such that, in this case, the method outputs a 3D modeled object which is plausible, and which tends to respect (e.g. respects) de deformation constraint. All decoded explored latent vectors may also be plausible 3D modeled objects. In other words, the method may determine a plausible 3D modeled object which tends to respect (e.g. respects, e.g. respects best) the deformation constraint among a plurality of plausible 3D modeled objects. Moreover, the 3D modeled object space may be a class of 3D modeled object, such that, in this case, the method may determine a plausible 3D modeled object of a class which tends to respect (e.g. respects, e.g. respects best) the deformation constraint among a plurality of plausible 3D modeled objects of the class. Furthermore, the method may do so automatically, such that in these examples the method is efficient and ergonomic.

In examples, the deformation constraint defines a geometrical shape. In these examples, the term penalizes a disparity between the result of applying the decoder to the explored latent vector and the geometrical shape.

The deformation defined by the deformation constraint may deform the shape of the part of the 3D modeled object into a new geometrical shape of part of the 3D modeled object. As a result, the deformation may also deform the whole 3D modeled object into a new 3D modeled object (which may be also referred to as the deformed input) by deforming the geometrical shape of the part. In other words, the new 3D modeled object may differ from the provided 3D modeled object in that the geometrical shape of the part is deformed. The geometrical shape defined by the deformation constraint may thus designate the new 3D modeled object. In examples where the decoder is the decoder of an autoencoder, the new 3D modeled object may be computed from the reconstructed 3D modeled object. That is, the autoencoder is applied to the 3D modeled object, thereby outputting a reconstructed 3D modeled object, and the new 3D modeled object is computed by applying the deformation defined by the deformation constraint to the reconstructed 3D modeled object. Alternatively, the geometrical shape defined by the deformation constraint may designate the new geometrical shape of the part of the 3D modeled object.

The disparity between the result of applying the decoder to the explored latent vector and the geometrical shape may be a quantity relative to (e.g. that is a function of) a difference or an error between the result of applying the decoder to the explored latent vector and the geometrical shape defined by the deformation constraint. In other words, the geometrical shape being defined by the deformation constraint, the disparity may be a quantity which provides a measure (e.g. a quantification) of the non-respect of the deformation constraint by the result of applying the decoder to the explored latent vector. In these examples, penalizing may mean that the quantity is an increasing function of the largeness of the measure.

In examples where the 3D modeled objects involved in the method are plausible 3D modeled objects, the method thus visits plausible 3D modeled objects (i.e. the decoded explored latent vectors) and penalized disparities between visited plausible 3D modeled objects and the geometrical shape defined by the deformation constraint, until a 3D modeled object (the decoded optimal latent vector) for which the disparity is acceptable (e.g. is the less penalized) is determined. In other words, the method determines a plausible 3D modeled object of which geometrical shape is (e.g. best) compliant with the geometrical shape defined by the deformation constraint.

In examples, the disparity involves a distance between a derivative of the result of applying the decoder to the explored latent vector and the geometrical shape.

The derivative of the result of applying the decoder to the explored latent vector may be a mathematical quantity obtained from the result of applying the decoder to the explored latent vector, e.g. by applying one or more mathematical formulae. In other words, the derivative of the result of applying the decoder to the explored latent vector may be a function of the result of applying the decoder to the explored latent vector. The disparity involves the distance between a derivative of the result of applying the decoder to the explored latent vector and the geometrical shape. In examples, it means that the disparity is a function of the distance.

Using the distance between a derivative of the result of applying the decoder to the explored latent vector and the geometrical shape is a simple and efficient way to measure (e.g. to quantify) non-respect of the deformation constraint. The method is thus efficient in these examples.

In examples, the disparity is a monotonic function of the distance.

The method thus measure efficiently, in these examples, non-respect of the deformation constraint: the more the deformation constraint is not respected, the larger the distance is, and the larger the disparity is. Conversely, the less the deformation constraint is not respected, the smaller the distance is, and the smaller the disparity is. The method is thus efficient.

In examples, the geometrical shape is defined in a 3D space and the derivative is the result of applying the decoder to the explored latent vector. In these examples, the geometrical shape may thus represent a new geometrical shape of the 3D modeled object, i.e. the geometrical shape of the 3D modeled object after the part of the 3D modeled object has undergone the deformation corresponding to the deformation constraint.

Alternatively, the geometrical shape may be defined in a 2D plane and the derivative may be a projection of the result of applying the decoder to the explored latent vector. In examples, the geometrical shape may thus be a 2D drawing of the user representing the new geometrical shape for the part of the 3D modeled object.

In examples, the 3D modeled object is a 3D mesh. In these examples, the 3D modeled object space is a space made of 3D meshes. The machine-learnt decoder thus takes values in the latent space and outputs 3D meshes.

In these examples, when the geometrical shape is defined in a 3D space and the derivative is the result of applying the decoder to the explored latent vector, the term may he of the type:

$$\sum_{i=1}^{k}\left[\sum_{j=1}^{M}\rho(\|g(z)_{v_i} - g(z)_j\|)\|g(z)_j - y_j\|_2^2\right]. \quad (1)$$

In formula (1), z is the explored latent vector, g the provided decoder, and g(z) is the result of applying the decoder to the explored latent vector. $v_1, v_2, \ldots, v_k$ are the indices of k vertices of g(z) representing the part of the 3D modeled object. In other words, the 3D modeled object is a 3D mesh, the part of the 3D modeled object is a sub mesh of the 3D mesh, g(z) is also a 3D mesh (since the 3D modeled object space is a 3D mesh space), and $v_1, v_2, \ldots, v_k$ are the indices of k vertices of g(z) representing the sub mesh of the 3D mesh. Representing may mean approximating, such that the sub mesh with indices $v_1, v_2, \ldots, v_k$ is the sub mesh of g(z) which approximates the best (e.g. which is the closest to) the part of the 3D modeled object. M is a sampling size of the 3D modeled object, e.g. a number of points of the 3D mesh. p is a non-negative and non-increasing function. In example, p is compactly supported. y is the geometrical shape. Formula (1) features squares of a norm of the $L^2$ norm type, namely the terms of the type $\|g(z)_j - y_j\mu_2\|^2$. It must be understood that such a norm is an example, put in formula (1) for the sake of clarity. The norm may however be replaced by any other norm or distance.

Alternatively, when the geometrical shape is defined in a 2D plane and the derivative is a projection of the result of applying the decoder to the explored latent vector, the term may be of the type:

$$\sum_{s \in S} \min_{j=1,\ldots,M} \|P[g(z)_j] - s\|_2^2. \quad (2)$$

In formula (2), z is the explored latent vector, M is a sampling size of the 3D modeled object, S is a set of pixel coordinates of the geometrical shape, g(z) is the result of applying the decoder to the explored latent vector and P is the projection. In examples, the user has sketched the deformation constraint by drawing over the 3D modeled object. In these examples, the geometrical shape is thus a set of pixels defined by the user's sketch. P may be a projection from the 3D modeled object space over a 2D space of objects defined with pixel coordinates. Once, more it is to be understood that the norm of the $L^2$ norm type of formula (2) is an example, put in the formula for the sake of clarity. The norm may however be replaced by any other norm or distance.

The applying S50 of the decoder to the optimal latent vector is now discussed.

Applying S50 the decoder to the optimal latent vector outputs a 3D modeled object. The 3D modeled object is inferred from the optimal latent vector. In other words, the method outputs the 3D modeled object corresponding to a minimum of the energy, that is a 3D modeled object which tends to respect (e.g. respects, e.g. respects best) the deformation constraint. In examples where 3D modeled objects involved in the method are plausible 3D modeled objects, the method thus outputs a plausible 3D modeled object (e.g. of a class) which tends to respect (e.g. respects, e.g. respects best) the deformation constraint among several plausible 3D modeled objects (e.g. of the class).

In examples, the method further comprises computing S60 a deformation operation, from the result of applying the decoder to the projection of the 3D modeled object onto the latent space, to the result of applying S50 the decoder to the optimized latent vector. In these examples, the method further comprises applying S70 the deformation operation to the 3D modeled object.

Computing S60 the deformation operation, from the result of applying the decoder to the projection of the 3D modeled object onto the latent space to the result of applying the decoder to the optimized latent vector means finding the deformation operation. The deformation operation transforms the result of applying the decoder to the projection of the 3D modeled object onto the latent space into the result of applying S50 the decoder to the optimized latent vector. In examples where projecting the 3D modeled object onto the latent space means applying an encoder of an autoencoder also comprising the machine-learnt decoder to the 3D modeled object, the method thus computes S60 a deformation which transforms the reconstructed 3D modeled object into the 3D modeled object corresponding to a minimum of the energy, that is a 3D modeled object which tends to respect (e.g. respects, e.g. respects best) the deformation constraint. Applying S70 the deformation operation to the 3D modeled object thus deforms the 3D modeled object into another 3D modeled object that tends to respect (e.g. respects, e.g. respects optimally) the deformation constraint. Such a deformation may preserve (e.g. topological) details of the 3D modeled object.

In examples where the 3D modeled objects involved in the method are plausible 3D modeled objects, the method may thus compute a transformation which transforms the 3D modeled object into another 3D modeled object that is plausible and that tends to respect (e.g. respects, e.g. respects best) the deformation constraint. In other words, upon the providing of the deformation constraint, the method may thus automatically deform the 3D modeled object into a 3D modeled object (e.g. of a class) which is plausible, and which tends to respect (e.g. respects, e.g. respects best) the deformation constraint among several other plausible objects (e.g. of the class). Also, deforming the 3D modeled object allows to preserve (e.g. topological) details of the 3D modeled object that the decoded optimal latent vector may not feature. In other words, outputting the decoded latent vector by itself may provide a plausible 3D modeled object tending to respect (e.g. respecting) the deformation constraint, but outputting in addition a deformation of the 3D modeled object into the decoded latent vector allows to output a plausible 3D object tending to respect (e.g. respecting) the deformation constraint as well as topological details of the provided 3D modeled object. The method is thus efficient, accurate and ergonomic.

Examples of the determining S40 are now discussed.

In examples, the machine-learnt decoder may be the decoder of an (e.g. machine-learnt) autoencoder that also comprises an encoder. In these examples, the determining S40 of the optimal latent vector may reward similarity between the result of applying the decoder to the explored latent vector and the 3D modeled object.

Rewarding may generally mean that the minimizing of the energy is conceived to tend to a result (i.e. the optimal latent vector) which is close to the projection of the 3D modeled object onto the latent space. Rewarding the similarity may comprise exploring latent vectors which are (e.g. relatively) close to the projection of the 3D modeled object onto the latent space. For example the exploring of the latent vectors may be performed iteratively (that is, latent vectors are explored one by one, until the optimal latent vector is found) and may start from a first latent vector which is the projection of the 3D modeled object onto the latent space. Alternatively or additionally, rewarding the similarity may be performed by considering an energy that comprises a quantity that is an increasing function of an error between the result of applying the decoder to the explored latent vector and the 3D modeled object.

Rewarding similarity allows rewarding of 3D modeled objects (i.e. decoded latent vector) which are similar to the provided 3D modeled object. Thus, the decoded optimal latent vector is not only a 3D modeled object which fits the deformation constraint but is also a 3D modeled object which is similar to the provided 3D modeled object. In examples, the method thus allows to determine a plausible 3D modeled object (e.g. of a class) which, among other plausible 3D modeled objects (e.g. of the class), fits (e.g. best) the deformation constraint defined by the user and the shape of the provided 3D modeled object. The method is thus efficient and accurate.

In these examples, the determining S40 of the optimal latent vector is performed iteratively, starting from a first explored latent vector which is the result of applying the encoder to the 3D modeled object. Starting this first explored latent vector is a particular efficient way to minimize the energy with an optimal latent vector which is relatively close to the encoded 3D modeled object, since exploration of latent vectors is carried out near the encoded 3D modeled object.

Additionally or alternatively the energy may comprise another term that rewards similarity between the explored latent vector and the result of applying the encoder to the 3D modeled object. Rewarding the similarity between the explored latent vector and the result of applying the encoder to the 3D modeled object allows avoidance of exploring latent vectors which are too far from the encoded 3D modeled object.

In examples, the other term involves a distance between the explored latent vector and the result of applying the encoder to the 3D modeled object. The distance is an efficient way to measure and reward closeness between latent vectors and the encoded 3D modeled object.

Rewarding the similarity between the explored latent vector and the result of applying the encoder to the 3D modeled object may mean that the other term is an increasing function of the distance between the explored latent vector and the result of applying the encoder to the 3D modeled object.

In examples, the energy comprises another term which rewards a likelihood of the explored latent vector on the latent space. In examples where a probability prior p(z) is given over the latent space, z being a variable representing latent vectors, the term may measure the largeness of p(z). The term may for example be a decreasing function of p(z). Thus, when p(z) is close to 1, that is when the latent vector has a large likelihood, the term is small. The likelihood of the optimal latent vector, and thus of the decoded optimal latent vector, is thus maximized.

Two examples of the method are now discussed. In the first example, the geometrical shape is defined in a 3D space and the derivative is the result of applying the decoder to the explored latent vector is now discussed. In the second example, the geometrical shape is defined in a 2D plane and the derivative is a projection of the result of applying the decoder to the explored latent vector. FIG. 4-9 illustrate the first example. FIG. 10-13 illustrate the second example.

In both examples, the user provides S10 the 3D modeled object which is a 3D mesh x that is a discretization of the provided 3D modeled object. In other words, the provided 3D modeled object is a 3D mesh. It is also provided S10 a machine-learnt autoencoder °f, where g is the machine-learnt decoder and where f is a machine-learnt encoder.

g(f(x)) is the reconstructed mesh representing the provided 3D modeled object, and let M be a notation for its number of points (i.e. its sampling size). In examples, a probabilistic prior p(z) is given over the latent space. In examples where this is not the case, p(z) may simply be replaced by p(z)=1 in all equations where p(z) appears, corresponding to a uniform prior. In examples, the method comprises projecting S20 x onto the latent space, by computing $z_0=f(x)$.

In the first example, the mesh x comprises control points $a_1, \ldots, a_n$ at characteristic places, using 3D interest points to find appropriate places. The user defines S30 a deformation constraint by pulling (e.g. through a drag and drop operation) one or several of these control points denoted $a_1, \ldots, a_k$ in order to deform the part of the 3D mesh. Let $a'_1, \ldots, a'_n$ be the coordinates of the control points after defining the deformation constraint. The deformation relative to the deformation constraint (i.e. the deformation resulting from applying the deformation constraint) may be computed with a Radial Basis Function (RBF) interpolation. The method may consider the RBF by a well-chosen function φ. The method may fit a deformation field $$\delta(X, Y, Z) = \sum_{i=1}^{n} \begin{pmatrix} r_i \\ s_i \\ t_i \end{pmatrix} \varphi\left(\left\|\begin{pmatrix} X \\ Y \\ Z \end{pmatrix} - a_i\right\|\right)$$

by solving the three following linear systems for r,s and t:

$$\forall j = 1, \ldots, n,$$

$$\sum_{i=1}^{n} \begin{pmatrix} r_i \\ s_i \\ t_i \end{pmatrix} \varphi(\|a_j - a_i\|) = a'_j - a_j$$

Figure 4:
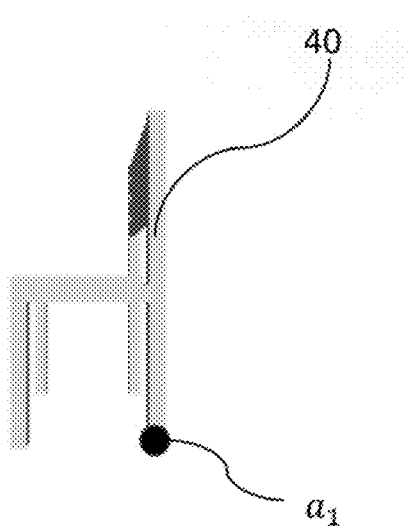
Figure 5:
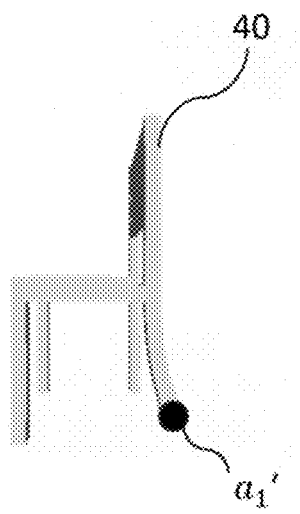

FIG. 4 illustrate an example of the mesh x. The mesh represents a plausible chair 40 with four legs, such as one of the chairs of FIG. 3. The chair is meshed, and the mesh comprises a control point $a_1$. As illustrated in FIG. 5, the user pulls the point $a_1$ in order to deform a leg of the chair 40 (which is a part of the chair). FIG. 5 shows the control point $a_1'$ after deformation.

Figure 6:
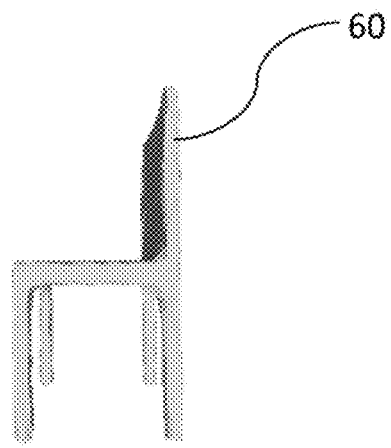
Figure 7:
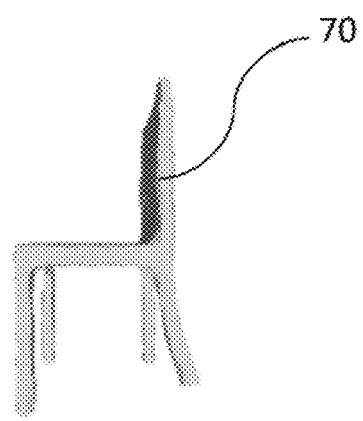

In this first example $v_1, \ldots, v_k$ be the indices of the closest vertices of the reconstructed 3D mesh g(z) to $a_1, \ldots, a_k$. In this example, $y=g(z_0)+\delta(g(z_0))$ is the deformed reconstructed 3D mesh under the deformation field δ. In other words, y is the new geometrical shape defined by the deformation constraint. FIG. 6 shows the reconstruction 60 of the 3D meshed chair 40 and FIG. 7 shows the deformed reconstructed 3D mesh 70.

The optimal latent vector is determined S40 by minimizing the energy, which is of the form:

$$E(z) = \sum_{i=1}^{k} \left[ \sum_{j=1}^{M} \rho(\|g(z)_{v_i} - g(z)_j\|) \|g(z)_j - y_j\|_2^2 \right] + \gamma \|z - z_0\|_2^2 - \beta \log(p(z))$$

where ρ is non-negative non-increasing function, e.g. with a compact support. ρ is used to fit the reconstruction to the user deformation only around where the user has pulled control points, so as to penalize non-respect of the deformation constraint by g(z). The method may optimize the latent vector z starting from $z_0$, to modify the reconstructed input g(z) such that it fits the deformation given by the user.

The energy may comprise another term $\gamma \|z-z_0\|_2^2$. In examples, $\gamma$ equals zero such the other term is not comprised in the energy. In other examples, $\gamma$ is not equal to zero, such that the other term is comprised in the energy. The other term is a smoothness term that is a distance between the explored latent vector z and the result $z_0$ of applying the encoder to the 3D modeled object. The other term prevents the optimization from mowing z too far away from $z_0$, and thus remains as close as possible to the original input, while fitting to the user-defined deformation field.

$\beta \log (p(z))$ is another term that rewards a likelihood of the explored latent vector z on the latent space, p(z) being a probabilistic prior given over the latent space. The another term is used to maximize the likelihood of the optimized shape. In examples, $\beta$ equals zero, such that the other term is not comprised in the energy. In other examples, $\beta$ is strictly positive, such that the other term is comprised in the energy.

The minimizing of E (i.e. the determining of the optimal latent vector) may comprise applying an iteratively reweighted least squares method, meaning that at each optimization iteration the method updates the least squares weights $\rho$ ($\|g(z)_{v_i} - g(z)_j\|$), but considers them fixed during the optimization step.

FIG. 8 illustrates the result of applying the decoder to the optimized latent vector in the case of the first example. The chair 80 is a mesh representing a is plausible chair that fits the deformation constraint defined by the user. The method may further comprise computing a deformation from the reconstructed chair 60 to the chair 80 fitting the deformation constraint. The result of applying the deformation to the chair 40 is a plausible chair 90 of FIG. 9 that respects both the deformation constraints and the initial shape of chair 40.

An implementation of the computing and the applying the deformation in the case of the first example is now further discussed.

The minimizing of the energy according to the first example led to an optimized latent vector $\hat{z} = \mathrm{argmin}_z E(z)$ which is as close as possible to the original input, while fitting to the user constraints, either given by control points or sketch. Nevertheless, this optimized shape is computed starting from the reconstruction $g(z_0)$ (illustrated by chair 80), which is not necessarily an exact reconstruction with perfect accuracy. Especially, the reconstruction does not have necessarily the same topology (e.g. number of chair rungs), and the local details of the input 3D modeled object 40 are not necessarily included in the reconstruction. In order to remain as close as possible to the style of the original chair 40, while fitting to the user constraints, the method may retarget the deformations between $g(z_0)$ (illustrated by chair 80) and $g(\hat{z})$ (illustrated by chair 70) to the original chair x. The method may use RBF interpolation to compute the deformation field $\theta$ between $g(z_0)$ and $g(\hat{z})$. The technique may be the same as the previously discussed RBF interpolation, except that the method may not use any control points, but instead may compute the deformation field using directly the vertices of the reconstruction (or a characteristic subset of these vertices).

Thus, to derive $$\theta(X, Y, Z) = \sum_{i=1}^{M} \begin{pmatrix} r_i \\ s_i \\ t_i \end{pmatrix} \varphi \left( \left\| \begin{pmatrix} X \\ Y \\ Z \end{pmatrix} - g(z_0)_i \right\| \right),$$

the method may solve the linear system $$\forall j = 1, \ldots, M,$$

$$\sum_{i=1}^{M} \begin{pmatrix} r_i \\ s_i \\ t_i \end{pmatrix} \varphi(\|g(z_0)_j - g(z_0)_i\|) = g(\hat{z})_j - g(z_0)_j$$

The final edited mesh 90 is simply given by the deformation field applied to the original mesh x:

$$x + \theta(x)$$

Notice that other retargeting methods could also be used to compute the deformation field, such that non rigid registration (See "Global Correspondence Optimization for Non-Rigid Registration of Depth Scans." H. U, R. Stunner, and M. Pauly, in Comput. Graph. Forum 27 (5): 1421-4430, 2008), or kernel regression.

In the second example, the user sketches over the 3D modeled object x. In a chosen view. FIG. 10 shows an example of the 3D modeled object x, which is a chair 100 with four legs such as the ones of FIG. 10. FIG. 10 shows a front view of the chair 100. Let P be the projection associated to the chosen view. P may be the projection from the 3D modeled object space to which the chair belongs and onto the 2D space of pixel coordinates on the screen. The user defines the deformation constraint by sketching a shape 102 on the screen. Let S be the pixels coordinates of the drawn sketch, or sub-sampled version of this drawing.

The optimal latent vector is determined S40 by minimizing the energy, which is of the form:

$$E(z) = \sum_{s \in S} \min_{j=1,\ldots,M} \|P[g(z)_j] - s\|_2^2 + \gamma \|z - z_0\|_2^2 - \beta \log(p(z))$$

The method may optimize the latent vector z starting from $z_0$, to modify the reconstructed input g(z) such that it fits the sketch given by the user.

The energy may comprise another term $\gamma \|z-z_0\|_2^2$. In examples, $\gamma$ equals zero such the other term is not comprised in the energy. In other examples, $\gamma$ is not equal to zero, such that the other term is comprised in the energy. The other term is a smoothness term that is a distance between the explored latent vector z and the result $z_0$ of applying the encoder to the 3D modeled object. The other term prevents the optimization from mowing z too far away from $z_0$, and thus remains as close as possible to the original input, while fitting to the user-defined deformation field.

$\beta \log (p(z))$ is another term that rewards a likelihood of the explored latent vector z on the latent space, p(z) being a probabilistic prior given over the latent space. The another term is used to maximize the likelihood of the optimized shape. In examples, $\beta$ equals zero, such that the other term is not comprised in the is energy. In other examples, $\beta$ is strictly positive, such that the other term is not comprised in the energy.

Figure 12:
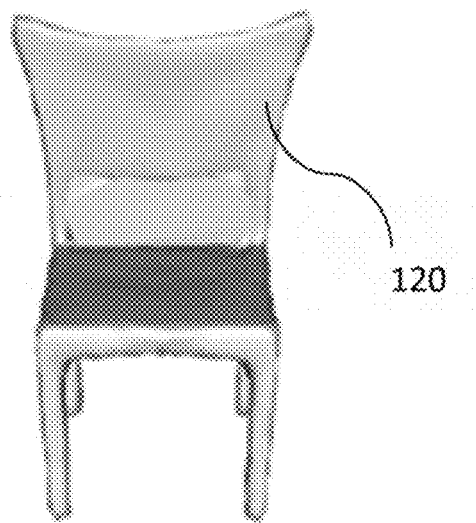
Figure 13:
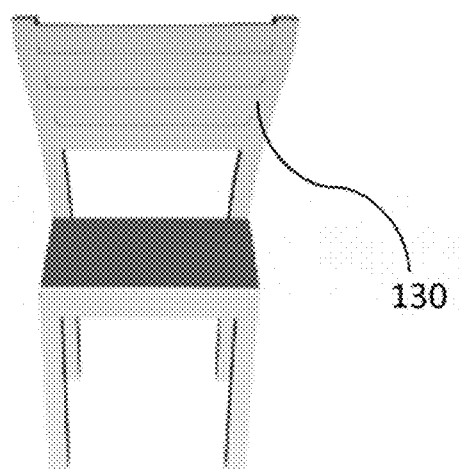

FIG. 12 shows an example of the result of applying S50 the decoder to the optimized latent vector. The chair 120 is a mesh representing a plausible chair that fits the deformation constraint defined by the user. The method may further comprise computing S60 a deformation from the reconstructed chair 110 of FIG. 11 to the chair 120 fitting the deformation constraint. The result of applying S70 the deformation to the chair 100 is a plausible chair 130 that respects both the deformation constraints and the initial shape of chair 100.

An implementation of the computing S60 and the applying S70 the deformation in the case of the second example is now further discussed.

The minimizing of the energy according to the second example led to an optimized latent vector $\hat{z}=\text{argmin}_z E(z)$ which is as close as possible to the original input, while fitting to the user constraints, either given by control points or sketch. Nevertheless, this optimized shape is computed starting from the reconstruction $g(z_0)$ (illustrated by chair 100), which is not necessarily an exact reconstruction with perfect accuracy. Especially, the reconstruction does not have necessarily the same topology (e.g. number of chair rungs), and the local details of the input 3D modeled object 100 are not necessarily included in the reconstruction. In order to remain as close as possible to the style of the original chair 100, while fitting to the user constraints, the method may retarget the deformations between $g(z_0)$ (illustrated by chair 100) and $g(\hat{z})$ (illustrated by chair 120) to the original chair x. The method may use RBF interpolation to compute the deformation field $\theta$ between $g(z_0)$ and $g(\hat{z})$. The technique may be the same as the previously discussed RBF interpolation, except that the method may not use any control points, but instead may compute the deformation field using directly the vertices of the reconstruction (or a characteristic subset of these vertices).

Thus, to derive $$\theta(X, Y, Z) = \sum_{i=1}^{M} \begin{pmatrix} r_i \\ s_i \\ t_i \end{pmatrix} \varphi\left(\left\|\begin{pmatrix} X \\ Y \\ Z \end{pmatrix} - g(z_0)_i\right\|\right),$$

the method may solve the linear system $$\forall j = 1, \ldots, M,$$

$$\sum_{i=1}^{M} \begin{pmatrix} r_i \\ s_i \\ t_i \end{pmatrix} \varphi(\|g(z_0)_j - g(z_0)_i\|) = g(\hat{z})_j - g(z_0)_j$$

The final edited mesh 130 is simply given by the deformation field applied to the original mesh x:

x+θ(x)

Notice that other retargeting methods could also be used to compute the deformation field, such that non rigid registration (See "Global Correspondence Optimization for Non-Rigid Registration of Depth Scans." H. Li, R. Sumner, and M. Pauly, in Comput. Graph. Forum 27 (5): 1421-1430, 2008), or kernel regression.

Figure 14:
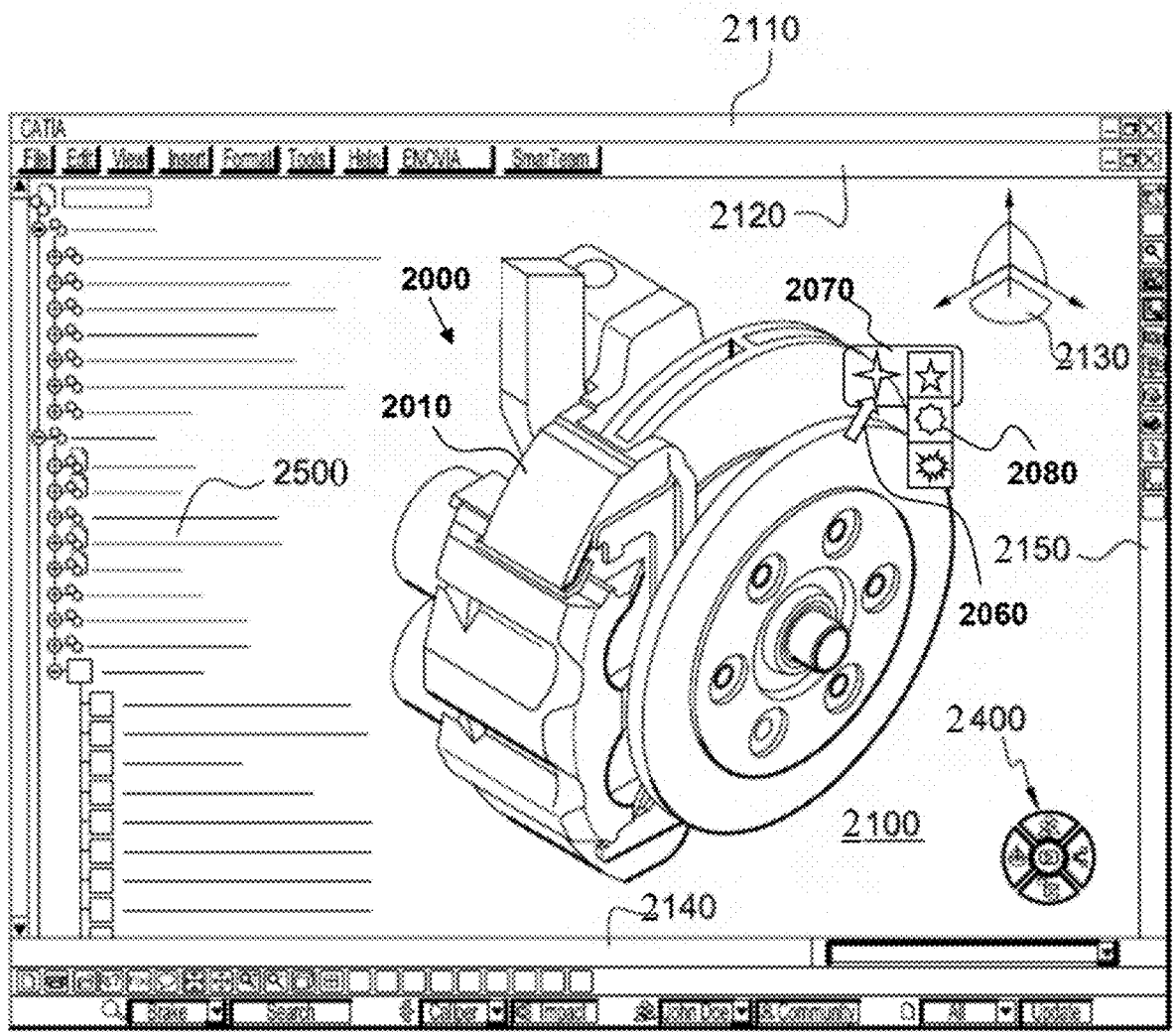
FIG. 14 shows an example of a graphical user interface of the system.

FIG. 14 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 15:
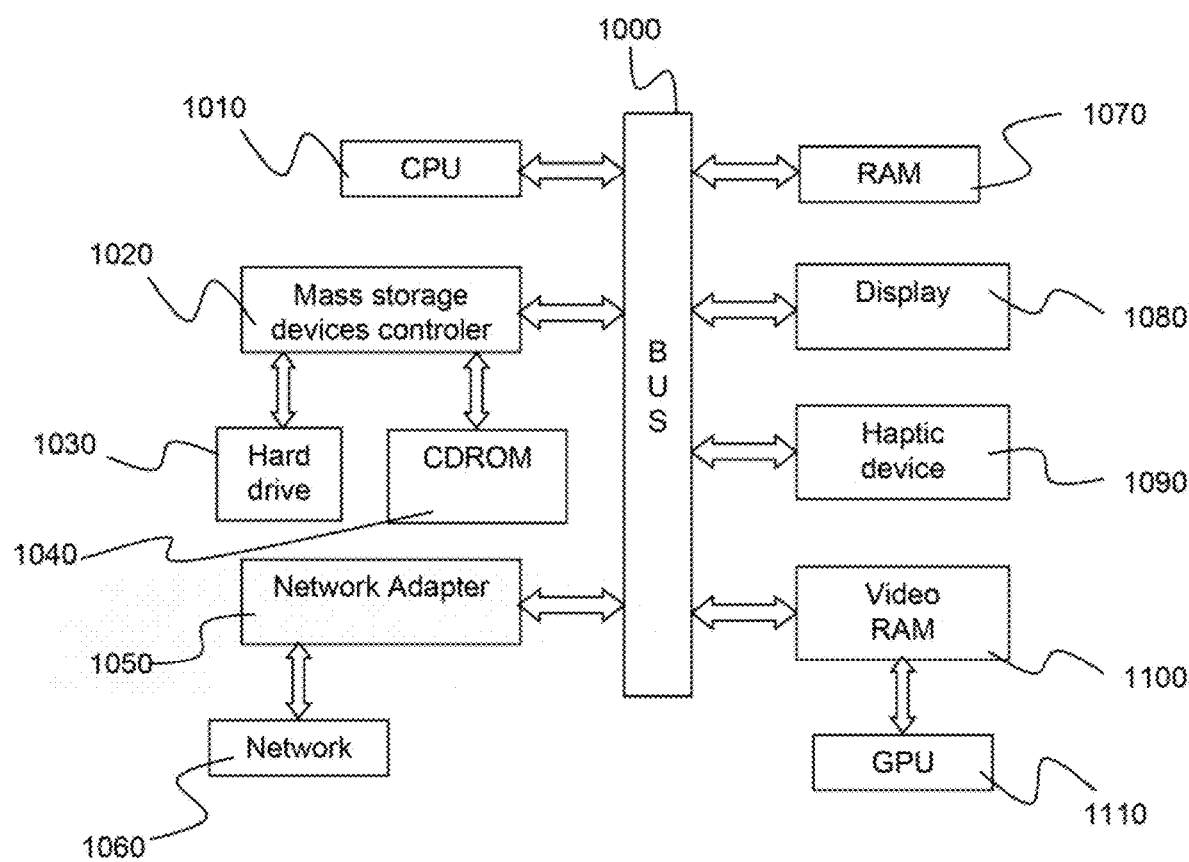
FIG. 15 shows an example of the system.

FIG. 15 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The invention claimed is:

1. A computer-implemented method for designing a 3D modeled object via user-interaction, the method comprising:
   obtaining:
      the 3D modeled object, the 3D modeled object having a given geometrical shape, and
      a machine-learnt decoder which is a differentiable function taking values in a latent space and outputting values in a 3D modeled object space;
   defining, by graphical user interaction with a displayed representation of the 3D modeled object, a deformed geometrical shape of the 3D modeled object, the deformed geometrical shape defining a deformation of the given geometrical shape;
   determining an optimal latent vector which minimizes an energy, the energy exploring latent vectors and comprising a term which, for each explored latent vector, depends increasingly on a quantification of a disparity between a result of applying the decoder to the explored latent vector and the deformed geometrical shape defined by the graphical user interaction; and
   applying the decoder to the optimal latent vector,
   wherein the disparity involves a distance between a derivative of the result of applying the decoder to the explored latent vector and the deformed geometrical shape,
   wherein the deformed geometrical shape is defined in a 3D space and the derivative is the result of applying the decoder to the explored latent vector, or the deformed geometrical shape is defined in a 2D plane and the derivative is a projection of the result of applying the decoder to the explored latent vector,
   wherein the 3D modeled object is a 3D mesh, and
   wherein when the deformed geometrical shape is defined in a 3D space and the derivative is the result of applying the decoder to the explored latent vector, the term is of type:

$\Sigma_{i=1}^{k}[\Sigma_{j=1}^{M}\rho(\|g(z)_{v_i}-g(z)_j\|)\|g(z)_j-y_j\|_2^2]$, where z is the explored latent vector;
g(z) is the result of applying the decoder to the explored latent vector;
$v_1, v_2, \ldots, v_k$ are the indices of k vertices of g(z) representing the part of the 3D modeled object;
M is a sampling size of the 3D modeled object;
$\rho$ is a non-negative and non-increasing function;
y is the geometrical shape; or
when the geometrical shape is defined in a 2D plane and the derivative is a projection of the result of applying the decoder to the explored latent vector, the term is of the type:

$\sum_{s \in S} \min_{j=1,\ldots,M} \|P[g(z)_j] - s\|_2^2$, where z is the explored latent vector;
M is a sampling size of the 3D modeled object;
S is a set of pixel coordinates of the geometrical shape;
g(z) is the result of applying the decoder to the explored latent vector;
P is the projection.

2. The method of claim 1, wherein the disparity is a monotonic function of the distance.

3. The method of claim 1, further comprising:
   computing a deformation operation, from the result of applying the decoder to the projection of the 3D modeled object onto the latent space, to the result of applying the decoder to the optimized latent vector; and
   applying the deformation operation to the 3D modeled object.

4. The method of claim 1, wherein the machine-learnt decoder is the decoder of an autoencoder that also includes an encoder, and
   wherein the determining of the optimal latent vector increasingly depends on similarity between the result of applying the decoder to the explored latent vector and the 3D modeled object in that the energy comprises a quantity that is an increasing function of an error between the result of applying the decoder to the explored latent vector and the 3D modeled object.

5. The method of claim 4, wherein the determining of the optimal latent vector is performed iteratively, starting from a first explored latent vector which is the result of applying the encoder to the 3D modeled object.

6. The method of claim 4, wherein the energy includes another term that increasingly depends on a distance between the explored latent vector and the result of applying the encoder to the 3D modeled object.

7. The method of claim 6, wherein the other term involves a distance between the explored latent vector and the result of applying the encoder to the 3D modeled object.

8. The method of claim 1, wherein the energy includes another term which depends decreasingly on a probability prior of the explored latent vector on the latent space.

9. A non-transitory data storage medium having recorded thereon a computer program comprising instructions for performing a method for designing a 3D modeled object via user-interaction, the method comprising:
   obtaining
      the 3D modeled object, the 3D modeled object having a given geometrical shape, and
      a machine-learnt decoder which is a differentiable function taking values in a latent space and outputting values in a 3D modeled object space;
   defining, by graphical user interaction with a displayed representation of the 3D modeled object, a deformed geometrical shape of the 3D modeled object, the deformed geometrical shape defining a deformation of the given geometrical shape;
   determining an optimal latent vector which minimizes an energy, the energy exploring latent vectors and comprising a term which, for each explored latent vector, depends increasingly on a quantification of a disparity between a result of applying the decoder to the explored latent vector and the deformed geometrical shape defined by the graphical user interaction; and
   applying the decoder to the optimal latent vector,
   wherein the disparity involves a distance between a derivative of the result of applying the decoder to the explored latent vector and the deformed geometrical shape, wherein the deformed geometrical shape is defined in a 3D space and the derivative is the result of applying the decoder to the explored latent vector, or the deformed geometrical shape is defined in a 2D plane and the derivative is a projection of the result of applying the decoder to the explored latent vector, wherein the 3D modeled object is a 3D mesh, and wherein when the deformed geometrical shape is defined in a 3D space and the derivative is the result of applying the decoder to the explored latent vector, the term is of type:

$\Sigma_{i=1}^{k}[\Sigma_{j=1}^{M}\rho(\|g(z)_{v_i}-g(z)_j\|)\|g(z)_j-y_j\|_2^2]$, where z is the explored latent vector;
g(z) is the result of applying the decoder to the explored latent vector;
$v_1, v_2, \ldots, v_k$ are the indices of k vertices of g(z) representing the part of the 3D modeled object;
M is a sampling size of the 3D modeled object;
$\rho$ is a non-negative and non-increasing function;
y is the geometrical shape; or wherein when the geometrical shape is defined in a 2D plane and the derivative is a projection of the result of applying the decoder to the explored latent vector, the term is of the type:

$$\sum_{s \in S} \min_{j=1,\ldots,M} \|P[g(z)_j] - s\|_2^2, \text{ where}$$

z is the explored latent vector;
M is a sampling size of the 3D modeled object;
S is a set of pixel coordinates of the geometrical shape;
g(z) is the result of applying the decoder to the explored latent vector;
P is the projection.

10. The data storage medium of claim 9, wherein the disparity involves a distance between a derivative of the result of applying the decoder to the explored latent vector and the deformed geometrical shape.

11. The data storage medium of claim 10, wherein:
the deformed geometrical shape is defined in a 3D space and the derivative is the result of applying the decoder to the explored latent vector; or the deformed geometrical shape is defined in a 2D plane and the derivative is a projection of the result of applying the decoder to the explored latent vector.

12. A computer system comprising:
a processor coupled to a memory and a display, the memory having recorded thereon a computer program comprising instructions for designing a 3D modeled object via user-interaction that when executed by the processor causes the processor to be configured to obtain
the 3D modeled object, the 3D modeled object having a given geometrical shape, and
a machine-learnt decoder which is a differentiable function taking values in a latent space and outputting values in a 3D modeled object space,
define, by graphical user interaction with a displayed representation of the 3D modeled object, a deformed geometrical shape of the 3D modeled object, the deformed geometrical shape defining a deformation of the given geometrical shape,
determine an optimal latent vector which minimizes an energy, the energy exploring latent vectors and comprising a term which, for each explored latent vector, depends increasingly on a quantification of a disparity between a result of applying the decoder to the explored latent vector and the deformed geometrical shape defined by the graphical user interaction, and
apply the decoder to the optimal latent vector,
wherein the disparity involves a distance between a derivative of the result of applying the decoder to the explored latent vector and the deformed geometrical shape,
wherein the deformed geometrical shape is defined in a 3D space and the derivative is the result of applying the decoder to the explored latent vector, or the deformed geometrical shape is defined in a 2D plane and the derivative is a projection of the result of applying the decoder to the explored latent vector,
wherein the 3D modeled object is a 3D mesh, and
wherein when the deformed geometrical shape is defined in a 3D space and the derivative is the result of applying the decoder to the explored latent vector, the term is of type:

$\Sigma_{i=1}^{k}[\Sigma_{j=1}^{M}\rho(\|g(z)_{v_i}-g(z)_j\|)\|g(z)_j-y_j\|_2^2]$, where z is the explored latent vector;
g(z) is the result of applying the decoder to the explored latent vector;
$v_1, v_2, \ldots, v_k$ are the indices of k vertices of g(z) representing the part of the 3D modeled object;
M is a sampling size of the 3D modeled object;
$\rho$ is a non-negative and non-increasing function;
y is the geometrical shape; or wherein when the geometrical shape is defined in a 2D plane and the derivative is a projection of the result of applying the decoder to the explored latent vector, the term is of the type:

$$\sum_{s \in S} \min_{j=1,\ldots,M} \|P[g(z)_j] - s\|_2^2, \text{ where}$$

z is the explored latent vector;
M is a sampling size of the 3D modeled object;
S is a set of pixel coordinates of the geometrical shape;
g(z) is the result of applying the decoder to the explored latent vector;
P is the projection.

13. The system of claim 12, wherein the disparity involves a distance between a derivative of the result of applying the decoder to the explored latent vector and the geometrical shape.

14. The system of claim 13, wherein:
the geometrical shape is defined in a 3D space and the derivative is the result of applying the decoder to the explored latent vector; or
the geometrical shape is defined in a 2D plane and the derivative is a projection of the result of applying the decoder to the explored latent vector.

* * * * *